(12) United States Patent
Kawai et al.

(10) Patent No.: US 8,663,062 B2
(45) Date of Patent: Mar. 4, 2014

(54) CONTROL DEVICE

(75) Inventors: Hideya Kawai, Anjo (JP); Takashi Yoshida, Nishio (JP)

(73) Assignee: Aisin AW Co., Ltd., Anjo (JP)

(*) Notice: Subject to any disclaimer, the term of this patent is extended or adjusted under 35 U.S.C. 154(b) by 0 days.

(21) Appl. No.: 13/565,296

(22) Filed: Aug. 2, 2012

(65) Prior Publication Data
US 2013/0053214 A1 Feb. 28, 2013

(30) Foreign Application Priority Data

Aug. 30, 2011 (JP) ................................. 2011-187742

(51) Int. Cl.
*B60W 10/08* (2006.01)

(52) U.S. Cl.
USPC ............................................................ 477/5

(58) Field of Classification Search
USPC .................................................. 475/5; 477/5
See application file for complete search history.

(56) References Cited

U.S. PATENT DOCUMENTS

| | | | |
|---|---|---|---|
| 6,524,219 B2 | 2/2003 | Mesiti et al. | |
| 7,131,510 B2 | 11/2006 | Mesiti et al. | |
| 7,160,225 B2 | 1/2007 | Berger et al. | |
| 7,347,803 B2 | 3/2008 | Kobayashi et al. | |
| 7,351,182 B2 * | 4/2008 | Kobayashi | 477/5 |
| 7,370,715 B2 | 5/2008 | Colvin et al. | |
| 7,472,769 B2 | 1/2009 | Yamanaka et al. | |
| 7,762,922 B2 | 7/2010 | Dreibholz et al. | |
| 7,770,678 B2 * | 8/2010 | Nozaki et al. | 180/65.6 |
| 7,784,575 B2 | 8/2010 | Yamanaka et al. | |
| 7,874,956 B2 | 1/2011 | Kouno | |
| 7,878,281 B2 | 2/2011 | Tanishima | |
| 7,892,139 B2 | 2/2011 | Kaltenbach | |
| 7,975,791 B2 | 7/2011 | Nozaki et al. | |
| 8,047,959 B2 | 11/2011 | Fuechtner et al. | |
| 8,065,047 B2 * | 11/2011 | Hasegawa et al. | 701/22 |

(Continued)

FOREIGN PATENT DOCUMENTS

| | | |
|---|---|---|
| JP | A-2003-284285 | 10/2003 |
| JP | A-2006-306209 | 11/2006 |

(Continued)

OTHER PUBLICATIONS

Aug. 28, 2012 International Search Report issued in International Patent Application No. PCT/JP2012/069166 (with translation).

(Continued)

*Primary Examiner* — Dirk Wright
(74) *Attorney, Agent, or Firm* — Oliff PLC

(57) ABSTRACT

A control device for controlling a vehicle drive device includes a rotary electric machine in a transmission path connecting a combustion engine with wheels; a first friction engagement device between the combustion engine and the rotary machine; and a second friction engagement device between the rotary machine and wheels. The control device shifts the first and second engagement devices from a state in which the first engagement device is disengaged and the second engagement device is in direct engagement so that force is transmitted between the rotary machine and wheels, to a state in which force is transmitted at least between the combustion engine and wheels, by shifting the second engagement device from direct engagement to a slip state and thereafter shifting the first engagement device from disengaged to engaged. After the state is changed, the control device shifts the second engagement device from slip engagement to direct engagement.

10 Claims, 6 Drawing Sheets

(56) References Cited

U.S. PATENT DOCUMENTS

| | | | |
|---|---|---|---|
| 8,142,328 | B2 | 3/2012 | Reuschel |
| 8,192,324 | B2 * | 6/2012 | Kraska et al. .............. 477/5 |
| 8,246,509 | B2 | 8/2012 | Mittelberger et al. |
| 8,292,779 | B2 | 10/2012 | Kaltenbach et al. |
| 8,298,117 | B2 | 10/2012 | Seel et al. |
| 8,388,494 | B2 | 3/2013 | Schiele et al. |
| 8,430,790 | B2 | 4/2013 | Kobayashi et al. |
| 8,465,393 | B2 | 6/2013 | Lemp et al. |
| 8,475,329 | B2 | 7/2013 | Sah |
| 2007/0056784 | A1 | 3/2007 | Joe et al. |
| 2007/0080005 | A1 | 4/2007 | Joe |
| 2007/0272456 | A1 * | 11/2007 | Shiiba .................. 180/65.2 |
| 2010/0056328 | A1 | 3/2010 | Schenk et al. |
| 2012/0122630 | A1 | 5/2012 | Huber et al. |
| 2012/0232732 | A1 | 9/2012 | Tsuda et al. |
| 2013/0012353 | A1 * | 1/2013 | Yoshida et al. ............ 477/5 |
| 2013/0053214 | A1 | 2/2013 | Kawai et al. |

FOREIGN PATENT DOCUMENTS

| | | |
|---|---|---|
| JP | A-2007-099141 | 4/2007 |
| JP | A-2010-070138 | 4/2010 |
| JP | A-2010-149640 | 7/2010 |
| JP | A-2010-188788 | 9/2010 |
| JP | A-2010-201962 | 9/2010 |

OTHER PUBLICATIONS

U.S. Appl. No. 13/539,946.

Aug. 14, 2012 International Search Report issued in International Patent Application No. PCT/JP2012/067375l; with English-language translation.

Aug. 8, 2013 Office Action in U.S. Appl. No. 13/539,946.

* cited by examiner

CONTROL DEVICE

INCORPORATION BY REFERENCE

The disclosure of Japanese Patent Application No. 2011-187742 filed on Aug. 30, 2011 including the specification, drawings and abstract is incorporated herein by reference in its entirety.

BACKGROUND OF THE INVENTION

The present invention relates to a control device for controlling a vehicle drive device provided with a rotary electric machine in a power transmission path connecting an internal combustion engine with wheels, a first friction engagement device between the internal combustion engine and the rotary electric machine, and a second friction engagement device between the rotary electric machine and the wheels.

DESCRIPTION OF THE RELATED ART

A device described in Japanese Patent Application Publication No. 2007-99141 (JP 2007-99141 A) is already known as a control device for controlling a vehicle drive device such as described above. In the description of the description of the related art section, the reference numerals (including the names of the corresponding members, as needed) used in JP 2007-99141 A will be cited in square brackets. This control device is structured such that a driving state is switchable between a state (hereinafter, may be called "electric drive state") [EV mode] in which a first friction engagement device [first clutch 6] is in a disengaged state and a second friction engagement device [second clutch 7] is in a direct engagement state so that a driving force is transmitted between a rotary electric machine and wheels, and a state (hereinafter, may be called "hybrid drive state") [HEV mode] in which both of the first friction engagement device and the second friction engagement device are in an engaged state so that the driving force is transmitted between an internal combustion engine and the wheels.

As disclosed in FIG. 14 and paragraphs 0081 to 0093, for example, in JP 2007-99141 A, when changing the state of the second friction engagement device from the direct engagement state to a slip engagement state in order to shift the driving state from the electric drive state to the hybrid drive state, this control device reduces a supply oil pressure to the second friction engagement device until the transfer torque capacity of the second friction engagement device reaches a slightly larger value than a predetermined value [value corresponding to a target transmission input torque tTi]. Thereafter, the control device controls the rotational speed of the second friction engagement device by using a proportional-integral controller [PI controller] so as to achieve a target slip amount [dNc2] of the second friction engagement device. Then, under a stable state in which the slip amount and the supply oil pressure (engagement pressure) of the second friction engagement device are maintained constant, the control device performs control to start the internal combustion engine while achieving a state in which torque corresponding to requested torque [transient target driving force tFo] is transmitted to the wheels [output shaft 3b]. In this manner, a shock associated with the start of the internal combustion engine is prevented from being transmitted to a vehicle while the requested torque is satisfied.

SUMMARY OF THE INVENTION

In a control method such as described above, the slip amount of the second friction engagement device is controlled in a feedback manner. Therefore, a relatively long period of time [an instant t2' to an instant t2 in FIG. 14] is required from when the second friction engagement device starts slipping until the slip amount and the supply oil pressure thereof reach the stable state. For that reason, there has been a problem that there is a delay from when the second friction engagement device starts slipping until the state is achieved in which the appropriate magnitude of torque is transmitted to the wheels.

Therefore, a control device is desired that can achieve the state in which the necessary torque is transmitted to the wheels quickly from when the second friction engagement device starts slipping.

According to an aspect of the present invention, a control device for controlling a vehicle drive device is provided with a rotary electric machine in a power transmission path connecting an internal combustion engine with wheels, a first friction engagement device between the internal combustion engine and the rotary electric machine, and a second friction engagement device between the rotary electric machine and the wheels. The control device shifts the state of the first friction engagement device and the second friction engagement device from a state in which the first friction engagement device is in a disengaged state and the second friction engagement device is in a direct engagement state so that a driving force is transmitted between the rotary electric machine and the wheels, to a state in which the driving force is transmitted at least between the internal combustion engine and the wheels, by shifting the second friction engagement device from the direct engagement state to a slip engagement state and thereafter shifting the first friction engagement device from the disengaged state to an engaged state. After the state is changed, the control device shifts the second friction engagement device from the slip engagement state to the direct engagement state. In this operation, the control device performs control to gradually reduce a supply oil pressure to the second friction engagement device so as to shift the second friction engagement device from the direct engagement state to the slip engagement state, and when the second friction engagement device is determined to have started slipping, to increase the supply oil pressure to the second friction engagement device by a predetermined amount of hydraulic pressure relative to the supply oil pressure at the time of the determination of the start of slip.

The term "rotary electric machine" is used as a concept that includes all of an electric motor, an electric generator, and a motor-generator having functions of both the electric motor and the electric generator as necessary.

The term "disengaged state" means a state in which neither rotation nor driving force is transmitted between two friction engagement members to be engaged by a friction engagement device in question. The term "slip engagement state" means a state in which the two friction engagement members are engaged with each other with a rotational speed difference therebetween so as to be capable of transmitting a driving force. The term "direct engagement state" means a state in which the two friction engagement members are engaged with each other in an integrally rotating manner. The term "engaged state" is used as a concept that includes both the slip engagement state and the directly connected engagement state.

According to the aspect, the second friction engagement device in the direct engagement state is temporarily placed in the slip engagement state when the state is changed from the state in which the driving force is transmitted between the rotary electric machine and the wheels to the state in which the driving force is transmitted at least between the internal combustion engine and the wheels. Therefore, it is possible to suppress transmission to the vehicle of a fluctuation in torque associated with the engagement of the first friction engagement device for shifting the state.

At this time, when the second friction engagement device with the gradually reduced supply oil pressure is determined to have started slipping, the supply oil pressure to the second friction engagement device is controlled in a feedforward manner so as to be increased by the predetermined amount of hydraulic pressure relative to the supply oil pressure at the time of the determination of the start of slip. Therefore, after the second friction engagement device starts slipping, a state can be quickly achieved in which necessary torque (such as an appropriate magnitude of torque corresponding to requested torque) is transmitted to the wheels through the second friction engagement device in the slip engagement state.

Here, the control device may be structured such that the control device increases the supply oil pressure to the second friction engagement device at least based on a phenomenon that a coefficient of friction between a friction engagement member on the side of the rotary electric machine and a friction engagement member on the side of the wheels in the second friction engagement device changes from a coefficient of static friction to a coefficient of dynamic friction at the time of the determination of the start of slip.

When a friction engagement device is in the direct engagement state, torque is transmitted by the static friction acting between the two friction engagement members engaged with each other by the friction engagement device. When the friction engagement device is in the slip engagement state, torque corresponding to an engagement pressure between the two friction engagement members is transmitted by the dynamic friction acting between the two friction engagement members of the friction engagement device. The engagement pressure between the two friction engagement members is determined depending on the supply oil pressure to the friction engagement device. As a result, the torque transmitted through the second friction engagement device is switched from the torque by the static friction to the torque by the dynamic friction between before and after the time when the second friction engagement device starts slipping and is shifted from the direct engagement state to the slip engagement state.

In view of this, with the structure described above, the torque transmitted to the wheels through the second friction engagement device in the slip engagement state can be in an appropriate magnitude because the supply oil pressure to the second friction engagement device is increased based on the phenomenon that the coefficient of friction between the two friction engagement members of the second friction engagement device changes from the coefficient of static friction to the coefficient of dynamic friction at the time of the determination of the start of slip.

The control device may also be structured such that the control device controls the supply oil pressure to the second friction engagement device based on the coefficient of static friction and requested torque required to be transmitted to the wheels after the start of reducing the supply oil pressure to the second friction engagement device but before the determination of the start of slip, and increases the supply oil pressure to the second friction engagement device based on the coefficient of dynamic friction and the requested torque after the determination of the start of slip.

According to this structure, before the determination of the start of slip, an appropriate magnitude of torque corresponding to the requested torque can be transmitted base on the coefficient of static friction to the wheels through the second friction engagement device in the direct engagement state. After the determination of the start of slip, the supply oil pressure to the second friction engagement device is increased based on the coefficient of dynamic friction, and thus, an appropriate magnitude of torque corresponding to the requested torque can also be transmitted to the wheels through the second friction engagement device after the second friction engagement device is placed in the slip engagement state. At this time, a common calculation formula for the supply oil pressure to the second friction engagement device can be applied to both the directly connected engagement and the slip engagement of the second friction engagement device, and the respective values of the supply oil pressure to the second friction engagement device before and after the determination of the start of slip can be properly calculated merely by changing the coefficient of friction.

The control device may also be structured such that the control device calculates the predetermined amount of hydraulic pressure based on the supply oil pressure to the second friction engagement device at the time of the determination of the start of slip and a difference between the coefficient of static friction and the coefficient of dynamic friction.

According to this structure, the time of the determination of the start of slip is used as a reference time, and the predetermined amount of hydraulic pressure (increase in the supply oil pressure to the second friction engagement device) is calculated based on the supply oil pressure to the second friction engagement device at the time of the determination and the difference between the coefficient of static friction and the coefficient of dynamic friction between the two friction engagement members engaged with each other by the second friction engagement device. Therefore, an appropriate value of the predetermined amount of hydraulic pressure can be calculated. More specifically, a product of the supply oil pressure to the second friction engagement device at the time of the determination of the start of slip and the difference between the two coefficients of friction is added to the supply oil pressure to obtain the predetermined amount of hydraulic pressure. Thus, the appropriate value of the predetermined amount of hydraulic pressure can be calculated correctly. As a result, the supply oil pressure to the second friction engagement device after the determination of the start of slip can be appropriately determined.

The control device may also be structured such that the control device maintains the supply oil pressure to the second friction engagement device at the level increased by the predetermined amount of hydraulic pressure until the second friction engagement device is shifted from the slip engagement state to the direct engagement state.

According to this structure, the state in which the necessary magnitude of torque (such as the appropriate magnitude of torque corresponding to the requested torque) is transmitted to the wheels can be appropriately maintained over a whole period until the second friction engagement device is shifted from the slip engagement state to the direct engagement state.

The control device may also be structured such that the control device calculates, based on requested torque required to be transmitted to the wheels, the supply oil pressure to the second friction engagement device gradually reduced before the determination of the start of slip and the supply oil pressure to the second friction engagement device maintained after the determination of the start of slip.

According to this structure, the torque corresponding to the requested torque can be appropriately transmitted to the wheels through the second friction engagement device in the slip engagement state.

The control device may also be structured such that the control device performs control so that the output torque of the rotary electric machine coincides with target torque when the second friction engagement device is in the direct engagement state, and performs control so that the rotational state of the rotary electric machine coincides with a target rotational state after the determination of the start of slip.

The term "rotational state" is used as a concept that includes a rotational position, a rotational speed, and a rotational acceleration. Accordingly, the control device may be structured such that the control device performs control, after the second friction engagement device is determined to have started slipping, so that the rotational position of the rotary electric machine coincides with a target rotational position, so that the rotational speed of the rotary electric machine coincides with a target rotational speed, or so that the rotational acceleration of the rotary electric machine coincides with a target rotational acceleration.

According to this structure, the rotary electric machine is controlled so that the output torque of the rotary electric machine coincides with target torque when the second friction engagement device is in the direct engagement state, and thereby, the torque coinciding with the target torque (such as the torque corresponding to the requested torque or torque for generating electricity) can be appropriately transmitted to the wheels through the second friction engagement device in the direct engagement state. When the second friction engagement device is in the slip engagement state, the rotational state of the rotary electric machine is controlled, and thereby, torque corresponding to a transfer torque capacity of the second friction engagement device can be transmitted to the wheels while maintaining the slip engagement state of the second friction engagement device.

The control device may also be structured such that the rotational state is a rotational speed while the target rotational state is a target rotational speed, and the control device sets the target rotational speed to such a value that a differential rotational speed between an input-side rotational member and an output-side rotational member of the second friction engagement device is greater than the differential rotational speed therebetween at the time of the determination of the start of slip.

According to this structure, the rotational speed of the rotary electric machine is controlled so as to coincide with the target rotational speed after the determination of the start of slip, and thereby, a predetermined differential rotational speed can be appropriately generated between the two friction engagement members of the second friction engagement device. Thus, the slip engagement state of the second friction engagement device can be appropriately maintained. At this time, the supply oil pressure to the second friction engagement device can be maintained at a hydraulic pressure equal to or higher than the hydraulic pressure at the time of the determination of the start of slip because the above-mentioned differential rotational speed is generated by controlling the rotational speed of the rotary electric machine. Therefore, the slip engagement state of the second friction engagement device can be appropriately maintained while suppressing the torque transmitted to the wheels from decreasing.

Each of the structures that have been described above may be applied to a structure in the case in which, in order to change the state from the state in which the driving force is transmitted between the rotary electric machine and the wheels to the state in which the driving force is transmitted at least between the internal combustion engine and the wheels, the second friction engagement device is shifted from the direct engagement state to the slip engagement state, and after the determination of the start of slip, the first friction engagement device is shifted from the disengaged state to the engaged state, and thereafter, the second friction engagement device is shifted from the slip engagement state to the direct engagement state while the internal combustion engine is started during this shift.

As one of application examples in such a case, a structure of the control device can be exemplified such that, in order to change the state from the state in which the driving force is transmitted between the rotary electric machine and the wheels to the state in which the driving force is transmitted at least between the internal combustion engine and the wheels, the second friction engagement device is shifted from the direct engagement state to the slip engagement state, and after the determination of the start of slip, the first friction engagement device is shifted from the disengaged state to the engaged state, and after the internal combustion engine is ignited while being rotated by the torque of the rotary electric machine, the second friction engagement device is shifted from the slip engagement state to the direct engagement state. According to this structure, the operational effects described above can be obtained in the structure in which the internal combustion engine is started by using the output torque of the rotary electric machine provided in the power transmission path connecting the internal combustion engine with the wheels, and the driving state is shifted from the state in which the driving force is transmitted between the rotary electric machine and the wheels to the state in which the driving force is transmitted at least between the internal combustion engine and the wheels.

As another one of application examples in such a case, a structure of the control device can be exemplified such that the control device is for controlling a vehicle drive provided, separately from the rotary electric machine, with a starting-purpose rotary electric machine for starting the internal combustion engine. To change the state from the state in which the driving force is transmitted between the rotary electric machine and the wheels to the state in which the driving force is transmitted at least between the internal combustion engine and the wheels, the control device shifts the second friction engagement device from the direct engagement state to the slip engagement state and, after the determination of the start of slip and also after the start of the internal combustion engine by the starting-purpose rotary electric machine, shifts the first friction engagement device from the disengaged state to the engaged state and, thereafter, shifts the second friction engagement device from the slip engagement state to the directly connected engagement. According to this structure, the operational effects described above can be obtained in the structure in which the internal combustion engine is started by using the output torque of the starting-purpose rotary electric machine other than the rotary electric machine provided in the power transmission path connecting the internal combustion engine with the wheels, and the driving state is shifted from the state in which the driving force is transmitted between the rotary electric machine and the wheels to the state in which the driving force is transmitted at least between the internal combustion engine and the wheels.

DETAILED DESCRIPTION OF THE EMBODIMENTS

Figure 1:
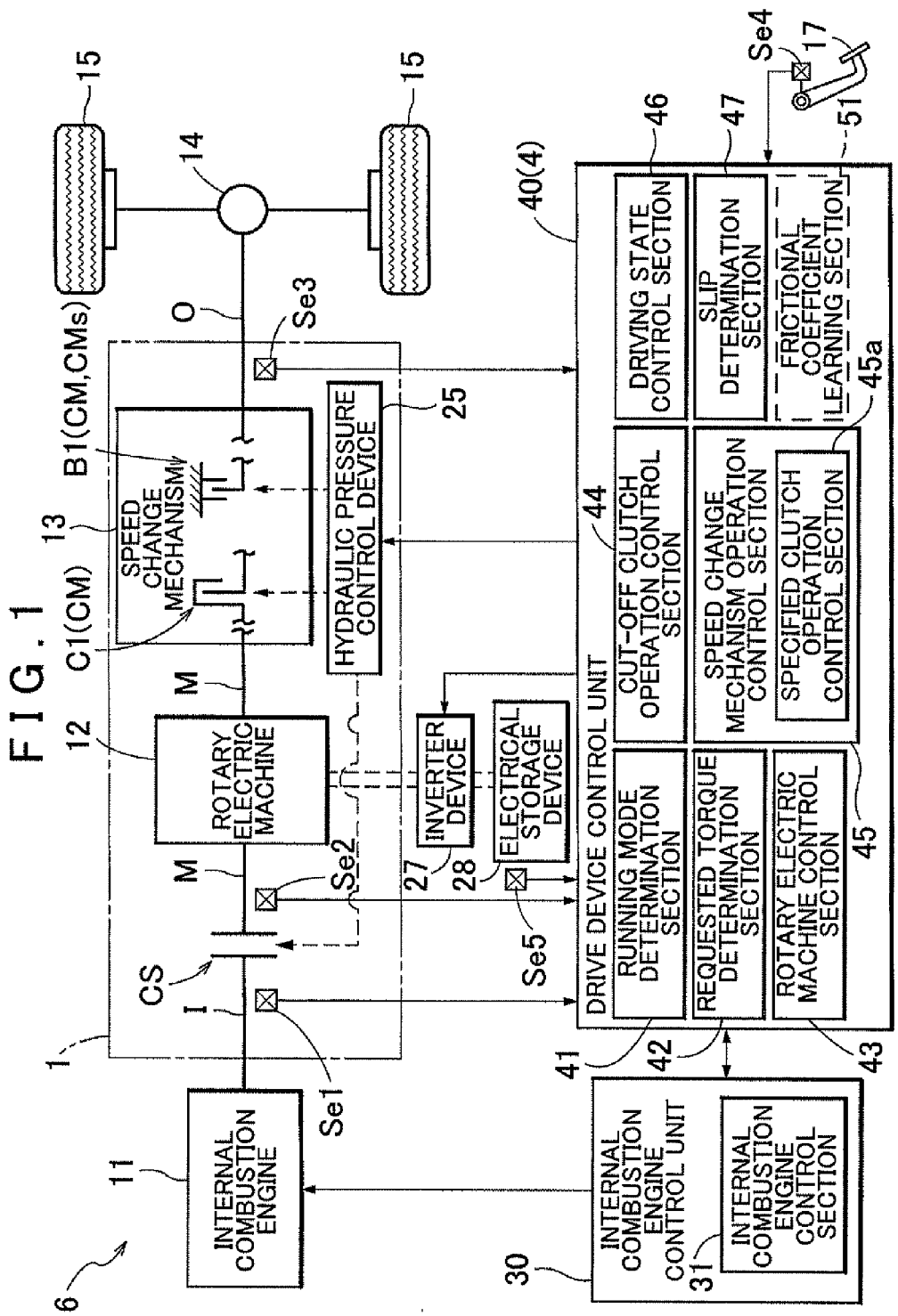
FIG. 1 is a schematic diagram showing a schematic structure of a vehicle drive device and a control device therefor according to an embodiment.

An embodiment of a control device according to the present invention will be described with reference to the accompanying drawings. As shown in FIG. 1, a control device 4 according to the embodiment is a control device for a drive device to control a drive device 1. Here, the drive device 1 according to the present embodiment is a vehicle drive device (hybrid vehicle drive device) for driving a vehicle (hybrid vehicle) 6 equipped with both an internal combustion engine 11 and a rotary electric machine 12 serving as sources of driving force for wheels 15. The control device 4 according to the embodiment will be described below in detail.

In the description given below, the term "drivingly coupled" means a state in which two rotational elements are coupled so as to be capable of transmitting a driving force, and used as a concept that includes a state in which the two rotational elements are coupled so as to rotate integrally with each other, or a state in which the two rotational elements are coupled so as to be capable of transmitting the driving force through one or two or more transmitting members. Such transmitting members include various members that transmit rotation at the same speed or at a changed speed, such as shafts, gear mechanisms, belts, and chains. Here, the term "driving force" is used in the same meaning as the term "torque".

A term "engagement pressure" represents a pressure to press one friction engagement member and the other friction engagement member of a friction engagement device against each other. A term "disengagement pressure" represents a pressure under which the friction engagement device is steadily placed in a disengaged state. A term "disengagement boundary pressure" represents a pressure (disengagement-side slip boundary pressure) under which the friction engagement device is placed in a slip boundary state between the disengaged state and a slip engagement state. A term "engagement boundary pressure" represents a pressure (engagement-side slip boundary pressure) under which the friction engagement device is placed in a slip boundary state between the slip engagement state and a direct engagement state. A term "complete engagement pressure" represents a pressure under which the friction engagement device is steadily placed in the direct engagement state.

1. Structure of Drive Device

Description will be made of a structure of the drive device 1 to be controlled by the control device 4 according to the embodiment. The drive device 1 according to the present embodiment is structured as a drive device for a so-called one-motor parallel type hybrid vehicle. As shown in FIG. 1, the drive device 1 is provided with the rotary electric machine 12 in a power transmission path connecting an input shaft I drivingly coupled to the internal combustion engine 11 with an output shaft O drivingly coupled to the wheels 15. The drive device 1 is also provided with a cut-off clutch CS between the internal combustion engine 11 and the rotary electric machine 12, and also a speed change mechanism 13 between the rotary electric machine 12 and the output shaft O. The speed change mechanism 13 is provided with a plurality of clutches and brakes for shifting (hereinafter collectively called "shifting clutches CM") other than the cut-off clutch CS. Note that FIG. 1 shows only a first clutch C1 and a first brake B1 as an example of the multiple shifting clutches CM. With this arrangement, the drive device 1 is provided, in the order from the side of the input shaft I, with the cut-off clutch CS, the rotary electric machine 12, and the shifting clutches CM in the power transmission path connecting the input shaft I with the output shaft O. These components of the structure are housed in a drive device case (not shown).

The internal combustion engine 11 is a motor that is driven by combustion of fuel inside the engine to take out power therefrom. For example, a gasoline engine or a diesel engine can be used as the internal combustion engine 11. The internal combustion engine 11 is drivingly coupled to the input shaft I so as to rotate integrally therewith. In the present example, an output shaft (internal combustion engine output shaft) such as a crankshaft of the internal combustion engine 11 is drivingly coupled to the input shaft I. The internal combustion engine 11 is drivingly coupled to the rotary electric machine 12 with the cut-off clutch CS interposed therebetween.

The cut-off clutch CS is provided so as to be capable of releasing the drivable coupling between the internal combustion engine 11 and the rotary electric machine 12. The cut-off clutch CS is a clutch that selectively drivingly couples the input shaft I to an intermediate shaft M and the output shaft O, and serves as an internal combustion engine cut-off clutch that disconnects the internal combustion engine 11 from the wheels 15. For example, a wet-type multi-plate clutch or a dry-type single-plate clutch can be used as the cut-off clutch CS. The cut-off clutch CS is structured as a friction engagement device that can transmit torque by a frictional force generated between friction engagement members engaged with each other. In the embodiment, the cut-off clutch CS corresponds to a "first friction engagement device" in the present invention.

The rotary electric machine 12 is structured to have a rotor and a stator (both not shown), and can perform a function as an electric motor that is supplied with electric power to generate kinetic power and a function as an electric generator that is supplied with kinetic power to generate electric power. The rotor of the rotary electric machine 12 is drivingly coupled to the intermediate shaft M so as to rotate integrally therewith. The rotary electric machine 12 is electrically connected to an electrical storage device 28 with an inverter device 27 interposed therebetween. For example, a battery or a capacitor can be used as the electrical storage device 28. The rotary electric machine 12 is supplied with electric power from the electrical storage device 28 to perform power running, or supplies the electrical storage device 28 with electric power generated by output torque (internal combustion engine torque Te) of the internal combustion engine 11 or by an inertia force of the vehicle 6 to store the electric power in the electrical storage device 28. The intermediate shaft M is drivingly connected to the speed change mechanism 13. That is, the intermediate shaft M serving as an output shaft of the rotor (rotor output shaft) of the rotary electric machine 12 serves as an input shaft (speed change input shaft) of the speed change mechanism 13.

In the embodiment, the speed change mechanism 13 is an automatic stepped speed change mechanism that has a plurality of shift speeds with different speed ratios (gear ratio) $\lambda$ in a switchable manner. In order to provide the multiple shift speeds, the speed change mechanism 13 is equipped with a differential gear unit and the multiple shifting clutches CM for engaging or disengaging rotational elements of the differential gear unit to switch the shift speed. Each of the multiple shifting clutches CM is also structured as a friction engagement device that can transmit torque by a frictional force generated between friction engagement members engaged with each other. In the present example, the shifting clutches CM provided in the speed change mechanism 13 include the first clutch C1, a second clutch, a third clutch, a fourth clutch, the first brake B1, and a second brake. The speed change mechanism 13 establishes each shift speed by placing predetermined two of the multiple shifting clutches CM in the direct engagement state and placing the other of the shifting clutches CM in the disengaged state.

Based on a predetermined speed ratio $\lambda$ set for each shift speed to be established, the speed change mechanism 13 changes the rotational speed of the intermediate shaft M and converts the torque thereof to transmit the changed rotational speed and the converted torque to the output shaft O. Here, the speed ratio $\lambda$ is a ratio of the rotational speed of the intermediate shaft M serving as the speed change input shaft to the rotational speed of the output shaft O serving as a speed change output shaft. Therefore, the speed change mechanism 13 changes the rotational speed of the intermediate shaft M by $1/\lambda$ times and converts the torque thereof by $\lambda$ times to transmit the changed rotational speed and the converted torque to the output shaft O. The torque transmitted from the speed change mechanism 13 to the output shaft O is distributed and transmitted to the two right and left wheels 15 through an output differential gear unit 14. With this arrangement, the drive device 1 can drive the vehicle 6 by transmitting the torque of one or both of the internal combustion engine 11 and the rotary electric machine 12 to the wheels 15.

In the embodiment, the drive device 1 is provided with an oil pump (not shown) that is drivingly coupled to the intermediate shaft M. The oil pump serves as a hydraulic pressure source for supplying oil to each part of the drive device 1. The oil pump generates hydraulic pressure by being driven by a driving force of one or both of the rotary electric machine 12 and the internal combustion engine 11. The oil from the oil pump is regulated to a predetermined hydraulic pressure by a hydraulic pressure control device 25, and then, supplied to the cut-off clutch CS and the multiple shifting clutches CM. The drive device 1 may be structured to be provided, separately from the oil pump, with an electric oil pump having a dedicated drive motor.

As shown in FIG. 1, a plurality of sensors Se1 to Se5 are provided in various parts of the vehicle 6 equipped with the drive device 1. The input shaft rotational speed sensor Se1 is a sensor that detects the rotational speed of the input shaft I. The rotational speed of the input shaft I detected by the input shaft rotational speed sensor Se1 is equal to the rotational speed of the internal combustion engine 11. The intermediate shaft rotational speed sensor Se2 is a sensor that detects the rotational speed of the intermediate shaft M. The rotational speed of the intermediate shaft M detected by the intermediate shaft rotational speed sensor Se2 is equal to the rotational speed of the rotor of the rotary electric machine 12. The output shaft rotational speed sensor Se3 is a sensor that detects the rotational speed of the output shaft O. The control device 4 can also derive a vehicle speed as a traveling speed of the vehicle 6 based on the rotational speed of the output shaft O detected by the output shaft rotational speed sensor Se3.

The accelerator operation amount detecting sensor Se4 is a sensor that detects an accelerator operation amount by detecting an operation amount of an accelerator pedal 17. The charging state detecting sensor Se5 is a sensor that detects a state of charge (SOC). The control device 4 can also derive an amount of charge of the electrical storage device 28 based on the SOC detected by the charging state detecting sensor Se5. Information indicating detection results by the sensors Se1 to Se5 are output to the control device 4.

2. Structure of Control Device

Description will be made of a structure of the control device 4 according to the embodiment. As shown in FIG. 1, the control device 4 according to the embodiment is provided with a drive device control unit 40. The drive device control unit 40 mainly controls the rotary electric machine 12, the cut-off clutch CS, and the speed change mechanism 13. The vehicle 6 is provided, separately from the drive device control unit 40, with an internal combustion engine control unit 30 that mainly controls the internal combustion engine 11.

The internal combustion engine control unit 30 and the drive device control unit 40 are structured so as to be capable of sending and receiving information to and from each other. Various functional sections provided in the internal combustion engine control unit 30 and the drive device control unit 40 are also structured so as to be capable of sending and receiving information to and from each other. The internal combustion engine control unit 30 and the drive device control unit 40 are also structured so as to be capable of obtaining the information of the detection results by the sensors Se1 to Se5.

The internal combustion engine control unit 30 is provided with an internal combustion engine control section 31.

The internal combustion engine control section 31 is a functional section that performs operation control of the internal combustion engine 11. The internal combustion engine control section 31 determines a target torque and a target rotational speed as control targets of the internal combustion engine torque Te and rotational speed, and operates the internal combustion engine 11 according to the control targets. In the embodiment, the internal combustion engine control section 31 can switch the operation control of the internal combustion engine 11 between torque control and rotational speed control depending on the running state of the vehicle 6. The torque control is control in which the target torque is given as a command to the internal combustion engine 11, and the internal combustion engine torque Te is controlled to coincide with (follow) the target torque. The rotational speed control is control in which the target rotational speed is given as a command to the internal combustion engine 11, and the target torque is determined so that the rotational speed of the internal combustion engine 11 coincides with (follows) the target rotational speed.

The drive device control unit 40 is provided with a running mode determination section 41, a requested torque determination section 42, a rotary electric machine control section 43, a cut-off clutch operation control section 44, a speed change mechanism operation control section 45, and a driving state control section 46.

The running mode determination section 41 is a functional section that determines a running mode of the vehicle 6. The running mode determination section 41 determines the running mode to be achieved by the drive device 1 based on, for example, the vehicle speed derived based on the detection result of the output shaft rotational speed sensor Se3, the accelerator operation amount detected by the accelerator operation amount detecting sensor Se4, and the amount of charge of the electrical storage device 28 derived based on the detection result of the charging state detecting sensor Se5. In that determination, the running mode determination section 41 refers to a mode selection map (not shown) provided by being stored in a recording device such as a memory.

In the example, the running mode selectable by the running mode determination section 41 includes an electric running mode and a hybrid running mode (parallel running mode in the example). In the electric running mode, the cut-off clutch CS is placed in the disengaged state, and the predetermined two of the shifting clutches CM are placed in the direct engagement state, and thus, the output torque (rotary electric machine torque Tm) of the rotary electric machine 12 is transmitted to the output shaft O and the wheels 15 to drive the vehicle 6. In the embodiment, the electric running mode achieves a "state in which the driving force is transmitted between the rotary electric machine and the wheels". In the hybrid running mode, the cut-off clutch CS and the predetermined two of the shifting clutches CM are placed in the engaged state, and thus, at least the internal combustion engine torque Te is transmitted to the output shaft O and the wheels 15 to drive the vehicle 6. In the embodiment, the hybrid running mode achieves a "state in which the driving force is transmitted at least between the internal combustion engine and the wheels". In the hybrid running mode, the rotary electric machine 12 outputs positive rotary electric machine torque Tm (>0) to assist the driving force obtained by the internal combustion engine torque Te, or outputs negative rotary electric machine torque Tm (<0) to generate electricity by using the internal combustion engine torque Te. Note that the modes described above are merely examples, and that structures can be employed that include various modes other than those described above.

The requested torque determination section 42 is a functional section that determines torque (necessary wheel driving torque) requested to be transmitted to the output shaft O for driving the wheels 15 of the vehicle 6. The requested torque determination section 42 determines the necessary wheel driving torque based on the vehicle speed derived based on the detection result of the output shaft rotational speed sensor Se3 and the accelerator operation amount detected by the accelerator operation amount detecting sensor Se4, and, for example, referring to a predetermined map (not shown). Based on the necessary wheel driving torque thus determined, the requested torque determination section 42 determines a requested torque Td serving as a command value for outputting the necessary wheel driving torque. The requested torque Td thus determined is output to the internal combustion engine control section 31, the rotary electric machine control section 43, and the speed change mechanism operation control section 45, for example.

The rotary electric machine control section 43 is a functional section that performs operation control of the rotary electric machine 12. The rotary electric machine control section 43 determines the a target torque and a target rotational speed as control targets of the rotary electric machine torque Tm and rotational speed, and operates the rotary electric machine 12 according to the control targets. In the embodiment, the rotary electric machine control section 43 can switch the operation control of the rotary electric machine 12 between torque control and rotational speed control depending on the running state of the vehicle 6. The torque control is control in which the target torque is given as a command to the rotary electric machine 12, and the rotary electric machine torque Tm is controlled to coincide with (follow) the target torque. The rotational speed control is control in which the target rotational speed is given as a command to the rotary electric machine 12, and the target torque is determined so that the rotational speed of the rotary electric machine 12 coincides with (follows) the target rotational speed.

The cut-off clutch operation control section 44 is a functional section that controls the operation of the cut-off clutch CS. The cut-off clutch operation control section 44 controls the supply oil pressure to the cut-off clutch CS through the hydraulic pressure control device 25, and thus controls the engagement pressure of the cut-off clutch CS to control the operation of the cut-off clutch CS. For example, the cut-off clutch operation control section 44 outputs a hydraulic pressure command value for the cut-off clutch CS to control, through the hydraulic pressure control device 25, the supply oil pressure to the cut-off clutch CS to be less than the disengagement boundary pressure, and thereby, places the cut-off clutch CS in the disengaged state. Alternatively, the cut-off clutch operation control section 44 controls, through the hydraulic pressure control device 25, the supply oil pressure to the cut-off clutch CS to be the engagement boundary pressure or more, and thereby, places the cut-off clutch CS in the direct engagement state. Still alternatively, the cut-off clutch operation control section 44 controls, through the hydraulic pressure control device 25, the supply oil pressure to the cut-off clutch CS to be a slip engagement pressure that is equal to or more than the disengagement boundary pressure and less than the engagement boundary pressure, and thereby, places the cut-off clutch CS in the slip engagement state.

The slip engagement state of the cut-off clutch CS is a state in which the input shaft I and the intermediate shaft M rotate relative to each other, and transmit the driving force therebetween. In either of the direct engagement state and the slip engagement state of the cut-off clutch CS, the magnitude of torque transmittable at a certain time depends on the engagement pressure of the cut-off clutch CS at that time. The magnitude of torque at that time is treated as a transfer torque capacity of the cut-off clutch CS. In the embodiment, the cut-off clutch operation control section 44 continuously controls the amounts of supply oil volume and supply oil pressure to the cut-off clutch CS using, for example, a proportional solenoid valve in response to the hydraulic pressure command value for the cut-off clutch CS, and thereby, can continuously perform control to increase or reduce the engagement pressure and the transfer torque capacity. It should be noted that, in the slip engagement state of the cut-off clutch CS, the direction of transmission of the torque transmitted through the cut-off clutch CS depends on the direction of the relative rotation between the input shaft I and the intermediate shaft M. More specifically, the torque is transmitted from the input shaft Ito the intermediate shaft M through the cut-off clutch CS when the rotational speed of the input shaft I is higher than that of the intermediate shaft M, whereas the torque is transmitted from the intermediate shaft M to the input shaft I through the cut-off clutch CS when the rotational speed of the input shaft I is lower than that of the intermediate shaft M.

In the present embodiment, the cut-off clutch operation control section 44 can switch the operation control of the cut-off clutch CS between torque capacity control and rotational speed control depending on the running state of the vehicle 6. The torque capacity control is control in which the transfer torque capacity of the cut-off clutch CS is controlled to coincide with (follow) a predetermined target transfer torque capacity. The rotational speed control is control in which the hydraulic pressure command value for the cut-off clutch CS or the target transfer torque capacity of the cut-off clutch CS is determined so that the rotational speed difference between the rotational speed of a rotational member (input shaft I in the example) coupled to the friction engagement member on one side of the cut-off clutch CS and the rotational speed of a rotational member (intermediate shaft M in the example) coupled to the friction engagement member on the other side of the cut-off clutch CS coincides with (follows) a predetermined target differential rotational speed. The rotational speed control of the cut-off clutch CS can control, for example, the rotational speed of the input shaft I so as to coincide with a predetermined target rotational speed by controlling the above-mentioned rotational speed difference to coincide with the predetermined target differential rotational speed, for example, in the state in which the rotational speed of the intermediate shaft M is controlled at a predetermined value.

The speed change mechanism operation control section 45 is a functional section that controls the operation of the speed change mechanism 13. The speed change mechanism operation control section 45 determines a target shift speed based on the accelerator operation amount and the vehicle speed, and controls the speed change mechanism 13 so as to establish the determined target shift speed. In that operation, the speed change mechanism operation control section 45 refers to a shift map (not shown) provided by being stored in the recording device such as a memory. The shift map is a map in which shift schedules are set based on the accelerator operation amount and the vehicle speed. The speed change mechanism operation control section 45 controls the supply oil pressure to the multiple shifting clutches CM provided in the speed change mechanism 13 based on the determined target shift speed so as to establish the target shift speed.

When establishing any one of the shift speeds, the speed change mechanism operation control section 45 controls the supply oil pressure to the multiple shifting clutches CM provided in the speed change mechanism 13 so as to place the predetermined two of the shifting clutches CM in the direct engagement state. In the embodiment, one of the two shifting clutches CM placed in the direct engagement state for establishing any one of the shift speeds is treated as a "specified clutch CMs". The speed change mechanism operation control section 45 is provided with a specified clutch operation control section 45*a* as a functional section that controls the operation of the specified clutch CMs. In the embodiment, the specified clutch CMs corresponds to a "second friction engagement device" in the present invention. In the embodiment, as an example, a certain one of the shift speeds is established by placing both the first clutch C1 and the first brake B1 in the direct engagement state and placing the other shifting clutches CM in the disengaged state.

The specified clutch operation control section 45*a* controls the supply oil pressure to the specified clutch CMs through the hydraulic pressure control device 25, and thus controls the engagement pressure of the specified clutch CMs to control the operation of the specified clutch CMs. The operation control of the specified clutch CMs performed by the specified clutch operation control section 45*a* is basically the same as the operation control of the cut-off clutch CS performed by the cut-off clutch operation control section 44 except that there are differences in the controlled object and some of items associated therewith. The same relation applies to the operation control of the other shifting clutches CM.

The driving state control section 46 is a functional section that shifts the driving state between the electric drive state and the hybrid drive state. Here, the electric drive state is a state in which the cut-off clutch CS is in the disengaged state and the shifting clutches CM (including the specified clutch CMs) are in the direct engagement state so that the driving force is transmitted between the rotary electric machine 12 and the wheels 15 (in the embodiment, a state in which the vehicle 6 travels in the electric running mode). In the electric drive state, the rotary electric machine torque Tm is transmitted to the output shaft O and the wheels 15. The hybrid drive state is a state in which both the cut-off clutch CS and the shifting clutches CM (including the specified clutch CMs) are in the engaged state so that the driving force is transmitted at least between the internal combustion engine 11 and the wheels 15 (in the embodiment, a state in which the vehicle 6 travels in the hybrid running mode). In the hybrid drive state, at least the internal combustion engine torque Te is transmitted to the output shaft O and the wheels 15.

When there is a change in the running mode determined by the running mode determination section 41, the driving state control section 46 shifts the driving state between the electric drive state and the hybrid drive state according to the change in the running mode. For example, when the vehicle 6 is placed in a situation of not requiring the internal combustion engine torque Te while traveling in the hybrid running mode, and thus when the running mode determined by the running mode determination section 41 is changed to the electric running mode, the driving state control section 46 performs control (internal combustion engine stop control) to stop the internal combustion engine 11, and thus shifts the state from the hybrid drive state to the electric drive state. The internal combustion engine stop control is performed by stopping fuel injection and spark ignition to the internal combustion engine 11.

On the other hand, for example, when the vehicle 6 is placed in a situation of requiring the internal combustion engine torque Te while traveling in the electric running mode, and thus when the running mode determined by the running mode determination section 41 is changed to the hybrid running mode, the driving state control section 46 performs control (internal combustion engine start control) to start the internal combustion engine 11, and thus shifts the state from the electric drive state to the hybrid drive state. In the embodiment, the driving state control section 46 is structured to perform the internal combustion engine start control by using the torque of the rotary electric machine 12 provided in the power transmission path connecting the input shaft I with the output shaft O. In that control, the driving state control section 46 shifts the specified clutch CMs among the shifting clutches CM from the direct engagement state to the slip engagement state, and thereafter, shifts the cut-off clutch CS from the disengaged state to the engaged state, and then, the driving state control section 46 commands the ignition to the internal combustion engine 11 while rotating the internal combustion engine 11 with the rotary electric machine torque Tm, and thereafter, shifts the specified clutch CMs from the slip engagement state to the direct engagement state. This mode switching control (hybrid mode shift control) from the electric running mode to the hybrid running mode will be described below in detail.

3. Specific Details of Hybrid Mode Shift Control

Figure 2:
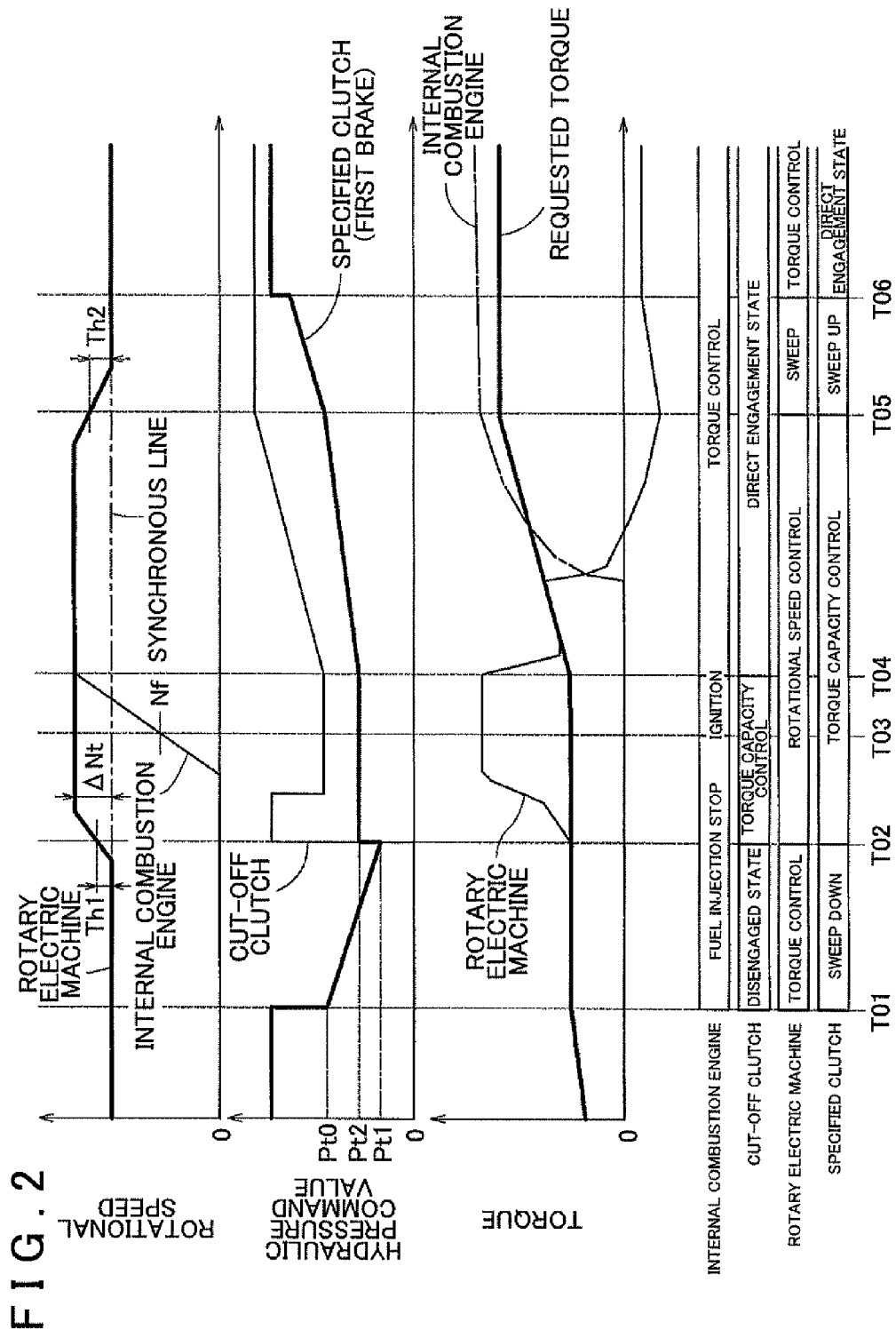
FIG. 2 is a timing chart showing an example of operating states of respective parts when hybrid mode shift control is performed.

Specific details of the hybrid mode shift control will be described with reference to a timing chart in FIG. 2. In the hybrid mode shift control, the internal combustion engine control section 31, the cut-off clutch operation control section 44, the rotary electric machine control section 43, and the specified clutch operation control section 45*a* function cooperatively with each other with the driving state control section 46 serving as a core section thereof, and thus control the internal combustion engine 11, the cut-off clutch CS, the rotary electric machine 12, and the specified clutch CMs in the speed change mechanism 13, respectively, in the following manner. The description given below assumes a situation in which the running mode is changed while the vehicle 6 is traveling in the electric running mode and in the state in which a predetermined shift speed (hereinafter called "current shift speed") is established in the speed change mechanism 13, and thus, the hybrid mode shift control including the internal combustion engine start control is performed to switch the mode to the hybrid running mode. In this assumed example, the first clutch C1 and the first brake B1 among the shifting clutches CM are placed in the direct engagement state so as to establish the current shift speed, and the first brake B1 among others is treated as the specified clutch CMs.

3-1. Shift from Electric Running Mode to Slip of Specified Clutch (Time from T01 to T02)

While the vehicle 6 is traveling in the electric running mode, the internal combustion engine control section 31 stops the fuel injection and the spark ignition to the internal combustion engine 11, and thus maintains the internal combustion engine 11 in a combustion stop state. Even after time T01 when the running mode is changed (an internal combustion engine starting condition is satisfied), the internal combustion engine control section 31 continues to stop the fuel injection and the spark ignition to the internal combustion engine 11 to maintain the internal combustion engine 11 in the combustion stop state until at least the specified clutch CMs is shifted to the slip engagement state.

While the vehicle 6 is traveling in the electric running mode, the cut-off clutch operation control section 44 controls, through the hydraulic pressure control device 25, the hydraulic pressure supplied to the cut-off clutch CS to be less than the disengagement boundary pressure, and thereby, keeps the cut-off clutch CS in the disengaged state. Even after time T01 when the running mode is changed, the cut-off clutch operation control section 44 maintains the cut-off clutch CS in the disengaged state until at least the specified clutch CMs is shifted to the slip engagement state.

While the vehicle 6 is traveling in the electric running mode, according to the requested torque Td determined by the requested torque determination section 42, the rotary electric machine control section 43 performs the torque control of the rotary electric machine 12 such that the rotary electric machine 12 outputs the rotary electric machine torque Tm that coincides with speed change input torque Ti corresponding to the requested torque Td. Here, the speed change input torque Ti is torque requested to be transmitted to the intermediate shaft M serving as the speed change input shaft in order that the necessary wheel driving torque coinciding with the requested torque Td is transmitted to the output shaft O. The speed change input torque Ti is calculated by Equation (1) given below, based on the requested torque Td and the speed ratio $\lambda$ of the shift speed established in the speed change mechanism 13.

$$Ti = Td \cdot (1/\lambda) \tag{1}$$

Even after time T01 when the running mode is changed, the rotary electric machine control section 43 continues to perform the torque control of the rotary electric machine 12 until at least the specified clutch CMs is shifted to the slip engagement state.

While the vehicle 6 is traveling in the electric running mode, the specified clutch operation control section 45a controls the hydraulic pressure supplied to the specified clutch CMs through the hydraulic pressure control device 25 to be the complete engagement pressure, and thereby, steadily keeps the specified clutch CMs in the direct engagement state. The specified clutch operation control section 45a reduces the supply oil pressure to the specified clutch CMs in a stepwise manner to an initial target pressure Pt0 at time T01 when the running mode is changed. Here, the initial target pressure Pt0 is set to a value lower than the complete engagement pressure and higher than a direct engagement limit pressure Pt1.

In the embodiment, the direct engagement limit pressure Pt1 is a pressure immediately before the specified clutch CMs in the direct engagement state is placed in the slip engagement state. This pressure corresponds to the engagement boundary pressure. The direct engagement limit pressure Pt1 such as described above is calculated based on a necessary transfer torque Tn corresponding to the requested torque Td and a coefficient of static friction $\mu s$ between two friction engagement members of the specified clutch CMs. Here, in the embodiment, the coefficient of static friction $\mu s$ is treated as a fixed value set in advance depending on the structure, material, and the like of the friction engagement members of the specified clutch CMs. The necessary transfer torque Tn is torque requested to be transmitted through the specified clutch CMs in order in order that the necessary wheel driving torque coinciding with the requested torque Td is transmitted to the output shaft O. The necessary transfer torque Tn is calculated by Equation (2) given below, based on the requested torque Td and a distribution ratio $\delta$.

$$Tn = Td \cdot (1/\lambda) \cdot \delta = Ti \cdot \delta \tag{2}$$

Here, the distribution ratio $\delta$ is a ratio of the torque allocated to the specified clutch CMs to the speed change input torque Ti.

Now, the specified clutch operation control section 45a calculates the direct connection limit pressure Pt1 that linearly depends on a value obtained by dividing the necessary transfer torque Tn by the coefficient of static friction $\mu s$, according to Equation (3) given below.

$$Pt1 = k1 \cdot Tn/\mu s + B \tag{3}$$

Here, k1 is a proportionality coefficient, and is determined depending on a total effective area and the like of the friction engagement members included in the specified clutch CMs. B is a constant, and corresponds to the hydraulic pressure (disengagement boundary pressure) at the time when the specified clutch CMs starts transmitting the torque.

The specified clutch operation control section 45a determines the initial target pressure Pt0 as a hydraulic pressure obtained by adding a predetermined allowance to the direct engagement limit pressure Pt1 thus obtained. Specifically, the initial target pressure Pt0 is determined as a hydraulic pressure obtained by adding, for example, 1% to 30% of a difference between the complete engagement pressure and the direct engagement limit pressure Pt1 to the direct engagement limit pressure Pt1. Such an allowance can have different values depending on the shift speed (speed ratio) established in the speed change mechanism 13. The allowance may also have a constant value regardless of the shift speed (speed ratio). The specified clutch operation control section 45a reduces the supply oil pressure to the specified clutch CMs to the initial target pressure Pt0 in a stepwise manner, and thereafter, reduces the supply oil pressure at a constant time rate of change to gradually reduce the engagement pressure of the specified clutch CMs. If instead the supply oil pressure to the specified clutch CMs is reduced to the direct engagement limit pressure Pt1 in a stepwise manner, the specified clutch CMs immediately starts slipping at that moment, and thus, it may be impossible to correctly determine a critical point at which the specified clutch CMs is switched from the direct engagement state to the slip engagement state. In view of this point, in the embodiment, the supply oil pressure to the specified clutch CMs is reduced in a stepwise manner to the initial target pressure Pt0 set as described above, and thereafter, is gradually reduced at a constant time rate of change. Ideally, the supply oil pressure to the specified clutch CMs is gradually reduced from the initial target pressure Pt0 to the direct engagement limit pressure Pt1.

As shown in FIG. 1, in the embodiment, the drive device control unit 40 is further provided with a slip determination section 47. The slip determination section 47 is a functional section that makes at least one of determinations of start of slip and end of slip of the specified clutch CMs. In the embodiment, the slip determination section 47 determines at least the start of slip of the specified clutch CMs when the specified clutch CMs is shifted from the direct engagement state to the slip engagement state while the hybrid mode shift control is performed.

The slip determination section 47 determines the start of slip of the specified clutch CMs based on an actual rotational speed of the rotary electric machine 12 and the intermediate shaft M, an estimated rotational speed (shown as "synchronous line" in FIG. 2, the same applies hereinafter) of the intermediate shaft M calculated depending on the rotational speed of the output shaft O, and a predetermined slip determination threshold Th1 set in advance. Here, the slip determination section 47 can obtain the actual rotational speed of the intermediate shaft M as the information of the detection result by the intermediate shaft rotational speed sensor Se2. The slip determination section 47 can also obtain the rotational speed of the output shaft O as the information of the detection result by the output shaft rotational speed sensor Se3, and can calculate the estimated rotational speed of the intermediate shaft M as a product of the obtained rotational speed of the output shaft O and the speed ratio λ of the shift speed established in the speed change mechanism 13. Now, the slip determination section 47 determines that the specified clutch CMs starts slipping (start of slip of the specified clutch CMs) at the time when the differential rotational speed between the actual rotational speed of the intermediate shaft M and the estimated rotational speed calculated as described above reaches the slip determination threshold Th1 or more.

Figure 6:
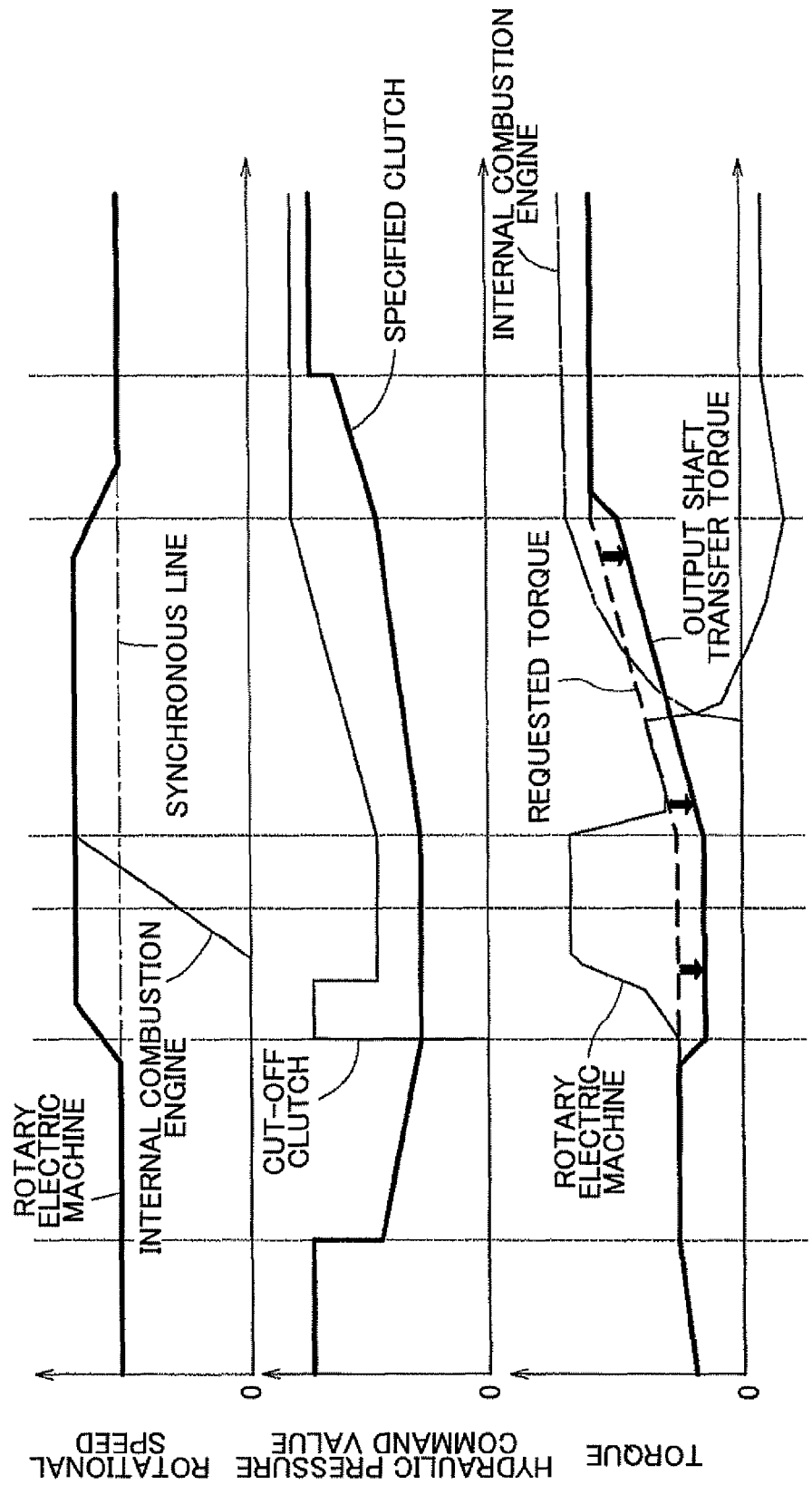
FIG. 6 is a timing chart showing a comparative example of operating states of the respective parts when the hybrid mode shift control is performed.

When the specified clutch CMs is in the direct engagement state, the torque is transmitted by the static friction acting between the two friction engagement members of the specified clutch CMs. On the other hand, when the specified clutch CMs is in the slip engagement state, torque corresponding to the engagement pressure between the two friction engagement members is transmitted by dynamic friction acting between the two friction engagement members of the specified clutch CMs. As a result, the torque transmitted through the specified clutch CMs is instantaneously switched from the torque by the static friction to the torque by the dynamic friction between before and after time T02 when the specified clutch CMs starts slipping. At this time, because a coefficient of dynamic friction μd between the two friction engagement members of the specified clutch CMs is lower than the coefficient of static friction μs therebetween (refer to FIG. 3), the torque transmitted through the specified clutch CMs is reduced by an amount proportional to the difference between the coefficient of static friction μs and the coefficient of dynamic friction μd when the supply oil pressure to the specified clutch CMs (engagement pressure of the specified clutch CMs) is maintained without change between before and after time T02 when the specified clutch CMs starts slipping. As a result, as shown in FIG. 6 as a comparative example, a torque drop may occur in which the torque actually transmitted to the output shaft O (shown as "output shaft transfer torque") falls short of the requested torque Td. Therefore, in order to solve such a problem, the embodiment employs a structure to perform hydraulic pressure adjustment control described below.

3-2. From Adjustment of Hydraulic Pressure to Start of Internal Combustion Engine (Time from T02 to T04)

After the slip determination section 47 determines the start of slip, the specified clutch operation control section 45a performs, in response to the determination of the start of slip, the hydraulic pressure adjustment control to increase the supply oil pressure to the specified clutch CMs by a predetermined amount of hydraulic pressure relative to the supply oil pressure at the time of the determination of the start of slip. In the hydraulic pressure adjustment control, the specified clutch operation control section 45a raises (increases) the supply oil pressure to the specified clutch CMs toward a revised target pressure Pt2 that is revised from the direct engagement limit pressure Pt1. Here, in the embodiment, the specified clutch operation control section 45a calculates the revised target pressure Pt2 based on at least the coefficient of dynamic friction μd between the two friction engagement members of the specified clutch CMs, and controls the supply oil pressure to the specified clutch CMs such that the supply hydraulic pressure to the specified clutch CMs coincides with the revised target pressure Pt2.

Using the time of the determination of the start of slip as a reference time, the specified clutch operation control section 45a calculates the revised target pressure Pt2 based on the necessary transfer torque Tn corresponding to the requested torque Td at the time of the determination, and also based on the coefficient of dynamic friction μd. More specifically, the specified clutch operation control section 45a determines the revised target pressure Pt2 that linearly depends on a division value obtained by dividing the necessary transfer torque Tn by the coefficient of dynamic fiction μd, according to Equation (4) given below.

$$Pt2 = k1 \cdot Tn/\mu d + B \quad (4)$$

Here, the proportionality coefficient k1 and the constant B are the same as those in Equation (3).

Figure 3:
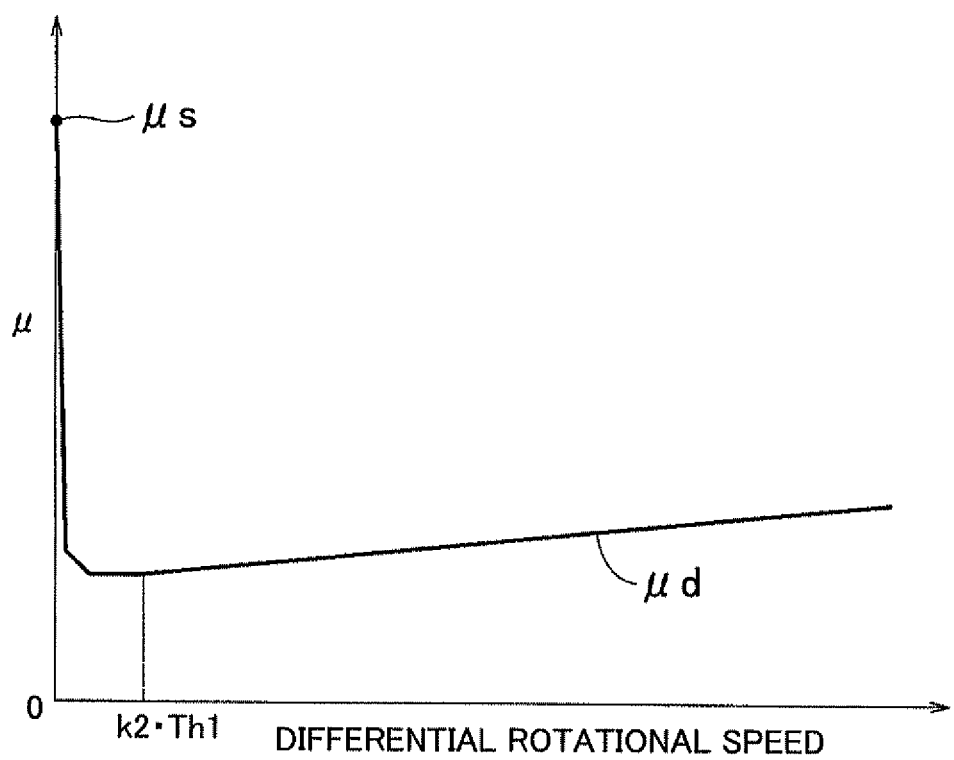
FIG. 3 is a graph showing a relationship between a differential rotational speed and a coefficient of friction between two friction engagement members.

It is generally proved that the coefficient of dynamic friction μd between two friction engagement members of a friction engagement device changes depending on the differential rotational speed between the two friction engagement members of the friction engagement device. For example, as shown in FIG. 3, the coefficient of dynamic friction μd significantly drops in a stepwise manner relative to the coefficient of static friction μs immediately after the differential rotational speed of the friction engagement device starts to be generated, and thereafter, gradually rises in small increments as the differential rotational speed of the friction engagement device increases. For that reason, in the embodiment, the specified clutch operation control section 45a sets the coefficient of dynamic friction μd of the specified clutch CMs depending on the differential rotational speed between the input-side rotational member and the output-side rotational member of the specified clutch CMs. More specifically, in the present embodiment, the slip determination section 47 determines the start of slip of the specified clutch CMs based on the slip determination threshold Th1, and in response to the determination of the slip, the specified clutch operation control section 45a performs the above-described hydraulic pressure adjustment control by using the coefficient of dynamic friction μd that depends on the differential rotational speed corresponding to the slip determination threshold Th1. Here, it is possible to use, as the differential rotational speed corresponding to the slip determination threshold Th1, a value calculated by multiplying the slip determination threshold Th1 by a predetermined coefficient k2 that corresponds to a speed ratio of a power transmission path from the intermediate shaft M serving as the speed change input shaft to the specified clutch CMs.

Then, the specified clutch operation control section 45a performs the torque capacity control of the specified clutch CMs based on the determined revised target pressure Pt2. More specifically, the specified clutch operation control section 45a controls the hydraulic pressure supplied to the specified clutch CMs through the hydraulic pressure control device 25 in a feedforward manner so as to adjust the supply oil pressure to the specified clutch CMs to the revised target pressure Pt2. With this control, the torque equal to the necessary transfer torque Tn is transmitted to the output shaft O through the specified clutch CMs in the slip engagement state. The hydraulic pressure adjustment control and the torque capacity control of the specified clutch CMs are performed as described, and thus, even when the torque transmitted through the specified clutch CMs is instantaneously switched from the torque by the static friction to the torque by the dynamic friction between before and after the time when the specified clutch CMs starts slipping, the torque transmitted through the specified clutch CMs is suppressed from changing from the necessary transfer torque Tn corresponding to the requested torque Td. As a result, the state is suppressed from changing from the state in which the torque actually transmitted to the output shaft O satisfies the requested torque Td. Also, even if the torque actually transmitted to the output shaft O temporarily falls short of the requested torque Td, it is possible to quickly achieve a state in which an appropriate magnitude of torque corresponding to the requested torque Td is transmitted to the output shaft O and the wheels 15. Particularly, compared with a case in which the supply oil pressure to the specified clutch CMs is controlled in a feedback manner so as to achieve a predetermined target state, it is possible to quickly achieve the state in which the appropriate magnitude of torque corresponding to the requested torque Td is transmitted to the output shaft O and the wheels 15.

After the start of slip is determined and until the internal combustion engine 11 actually starts, the cut-off clutch operation control section 44 performs the torque capacity control of the cut-off clutch CS. More specifically, the cut-off clutch operation control section 44 sets torque for raising the rotational speed of the input shaft I and the internal combustion engine 11 as the target transfer torque capacity, and performs the torque capacity control of the cut-off clutch CS so that the transfer torque capacity of the cut-off clutch CS coincides with the target transfer torque capacity.

After the determination of the start of slip, the rotary electric machine control section 43 performs rotational state control of the rotary electric machine 12, that is, performs feedback control of a rotational state of the rotary electric machine 12 such that the rotational state of the rotary electric machine 12 coincides with a determined target rotational state. In the embodiment, the rotary electric machine control section 43 performs the rotational speed control of the rotary electric machine 12 as the rotational state control, that is, performs feedback control of the rotational speed of the rotary electric machine 12 such that the rotational speed of the rotary electric machine 12 coincides with the determined target rotational speed. In the rotational speed control, the target rotational speed of the rotary electric machine 12 is set to such a value that the differential rotational speed between the input-side rotational member and the output-side rotational member of the specified clutch CMs is greater than the differential rotational speed therebetween at the time of the determination of the start of slip. From another point of view, the target rotational speed of the rotary electric machine 12 is set so that the differential rotational speed between the actual rotational speed of the intermediate shaft M and the estimated rotational speed of the intermediate shaft M calculated based on the rotational speed of the output shaft O coincides with a target differential rotational speed ΔNt that is set to a value greater than the slip determination threshold Th1. The target differential rotational speed ΔNt such as described above has a value large enough not to place the specified clutch CMs in the direct engagement state even when the rotational speed of the rotary electric machine 12 temporarily changes due to slip of the cut-off clutch CS. The slip engagement state of the specified clutch CMs is appropriately maintained by the rotational speed control of the rotary electric machine 12 such as described above.

In this manner, in the embodiment, the intended differential rotational speed is generated in the specified clutch CMs by controlling the rotational speed of the rotary electric machine 12. Therefore, the supply oil pressure to the specified clutch CMs can be maintained at the revised target pressure Pt2 which is equal to or higher than the hydraulic pressure (here, the direct engagement limit pressure Pt1) at the time of the determination of the start of slip. Consequently, the slip engagement state of the specified clutch CMs can be appropriately maintained while suppressing the torque transmitted to the wheels 15 from decreasing to such a level as to fail to satisfy the requested torque Td.

In the rotational speed control of the rotary electric machine 12, the rotary electric machine control section 43 makes the rotary electric machine 12 output the rotary electric machine torque Tm within the maximum producible torque limit in the positive direction against load torque acting on the internal combustion engine 11 that is initially in a stopped state. The rotary electric machine torque Tm is transmitted to the input shaft I and the internal combustion engine 11 through the cut-off clutch CS in the slip engagement state, and thereby, the rotational speed of the input shaft I and the internal combustion engine 11 gradually rises.

The internal combustion engine control section 31 maintains the state of stopping the fuel injection and the spark ignition for a while after the determination of the start of slip. In the embodiment, when the rotational speed of the internal combustion engine 11 has risen from zero and eventually reaches a predetermined ignition rotational speed Nf or more at time T03, the internal combustion engine control section 31 starts the fuel injection and the spark ignition to the internal combustion engine 11 to start the internal combustion engine 11. In the embodiment, the ignition rotational speed Nf is set to a rotational speed (such as a rotational speed during idling) at which the internal combustion engine 11 can be started by being ignited.

3-3. Shift of Specified Clutch to Direct Engagement (Time from T04 to T06)

Along with the start of the internal combustion engine 11, the rotational speed thereof rises, and eventually, the internal combustion engine 11 is synchronized with the rotary electric machine 12 at time T04. Then, the cut-off clutch operation control section 44 controls the hydraulic pressure supplied to the cut-off clutch CS through the hydraulic pressure control device 25 so as to place the cut-off clutch CS in the direct engagement state from then on.

After the cut-off clutch CS is placed in the direct engagement state, the internal combustion engine control section 31 performs the torque control of the internal combustion engine 11 by using torque corresponding to the requested torque Td (that is, torque calculated by dividing the requested torque Td by the speed ratio $\lambda$) as target torque. When the rotary electric machine 12 generates electricity, the internal combustion engine control section 31 performs the torque control of the internal combustion engine 11 by using, as the target torque, torque obtained by adding torque (electric power generation torque) for generating the electricity by the rotary electric machine 12 to the torque corresponding to the requested torque Td.

The rotary electric machine control section 43 continues to perform the rotational speed control of the rotary electric machine 12 in the slip engagement state of the specified clutch CMs even after the cut-off clutch CS is placed in the direct engagement state. When the internal combustion engine 11 becomes able to continue autonomous running in a stable manner and to output a certain magnitude of internal combustion engine torque Te, the rotary electric machine control section 43 sets a target rotational speed that gradually decreases at a constant time rate of change toward the estimated rotational speed of the intermediate shaft M calculated depending on the rotational speed of the output shaft O in the rotational speed control of the rotary electric machine 12. Thereby, the rotational speed of the input shaft I and the intermediate shaft M rotating integrally with each other gradually drops toward the estimated rotational speed of the intermediate shaft M.

The slip determination section 47 determines the end of slip of the specified clutch CMs when the specified clutch CMs is returned from the slip engagement state to the original direct engagement state while the hybrid mode shift control is performed. Accordingly, the slip determination section 47 also serves as a "slip end determination section". The slip determination section 47 determines the end of slip of the specified clutch CMs based on the actual rotational speed of the rotary electric machine 12 and the intermediate shaft M, the estimated rotational speed of the intermediate shaft M calculated depending on the rotational speed of the output shaft O, and a predetermined synchronization determination threshold Th2 set in advance. More specifically, the slip determination section 47 determines that the rotational members coupled to the two friction engagement members of the specified clutch CMs are synchronized with each other (end of slip of the specified clutch CMs) at the time when the differential rotational speed between the actual rotational speed and the estimated rotational speed of the intermediate shaft M reaches the synchronization determination threshold Th2 or less.

After the slip determination section 47 determines the end of slip, the rotary electric machine control section 43 terminates the rotational speed control of the rotary electric machine 12, and, after performing sweep control, performs the torque control of the rotary electric machine 12 from time T06 on. In this case, because the internal combustion engine 11 has already started and is in the state of outputting the large internal combustion engine torque Te, the target torque of the rotary electric machine 12 can be set, for example, to torque (zero torque) for allowing the rotary electric machine 12 to run idle or the torque (electric power generation torque) for allowing the rotary electric machine 12 to generate electricity.

The specified clutch operation control section 45a performs the torque capacity control of the specified clutch CMs even after the cut-off clutch CS is placed in the direct engagement state. After the slip determination section 47 determines the end of slip, the specified clutch operation control section 45a raises the hydraulic pressure supplied to the specified clutch CMs through the hydraulic pressure control device 25 at a constant time rate of change, and at time T06 when a predetermined period of time has passed, raises the supply oil pressure to the specified clutch CMs to the complete engagement pressure in a stepwise manner. Thus, the hybrid mode shift control is finished, and thereafter, the vehicle 6 travels in the hybrid running mode.

Figure 4:
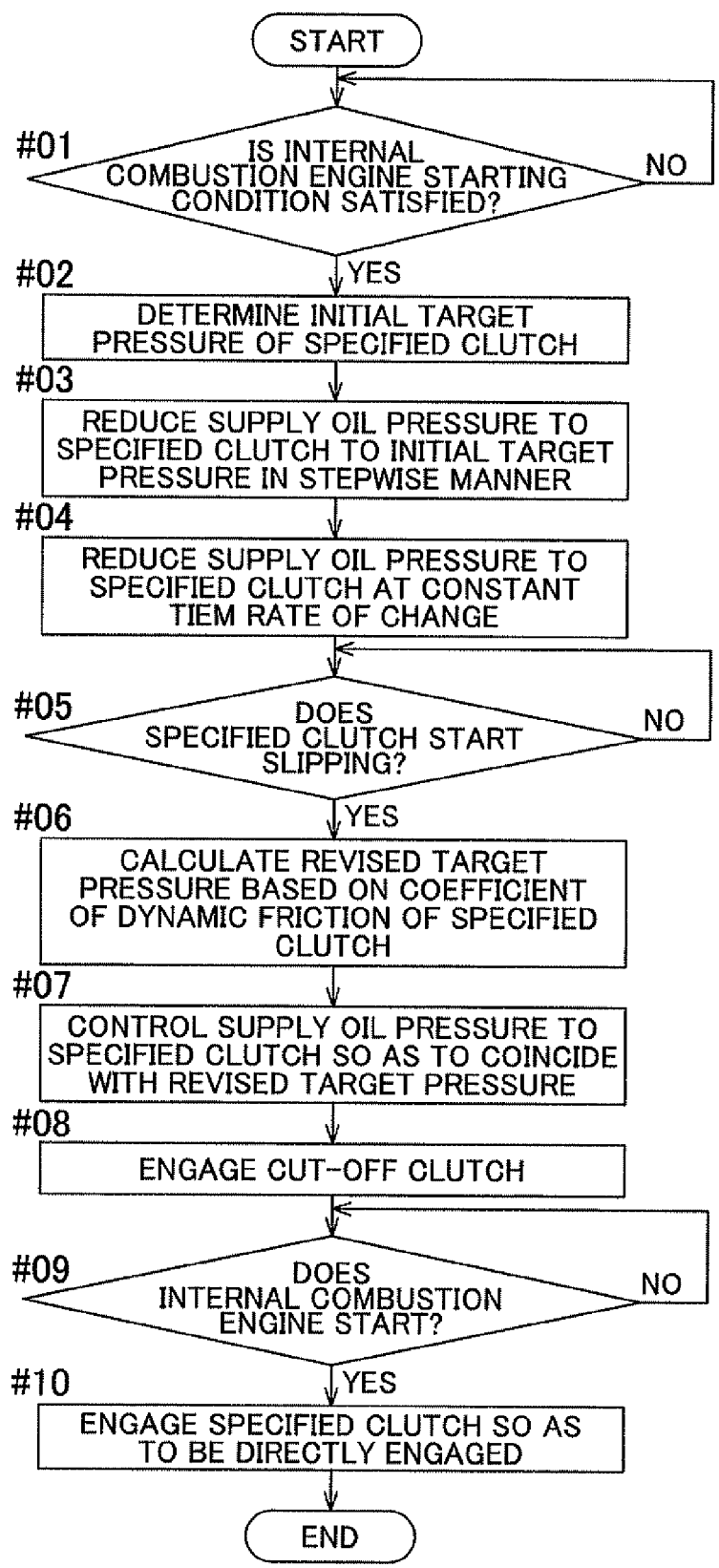
FIG. 4 is a flow chart showing a processing procedure of the hybrid mode shift control including hydraulic pressure adjustment control.

4. Processing Procedure of Hybrid Mode Shift Control Including Hydraulic Pressure Adjustment Control A processing procedure of the hybrid mode shift control including the hydraulic pressure adjustment control according to the present embodiment will be described with reference to a flow chart in FIG. 4. In the same manner as the description given above, the description here assumes a situation in which, while the vehicle 6 is traveling in the electric running mode, the running mode is changed to the hybrid running mode.

First, it is determined whether the running mode is changed (whether the internal combustion engine starting condition is satisfied) (Step #01). If the running mode is changed (Yes at Step #01), the initial target pressure Pt0 of the specified clutch CMs is next determined (Step #02). The initial target pressure Pt0 is set to a value greater than the direct engagement limit pressure Pa which is calculated based on the necessary transfer torque Tn and the coefficient of static friction μs of the specified clutch CMs. Then, the supply oil pressure to the specified clutch CMs is reduced to the initial target pressure Pt0 in a stepwise manner (Step #03), and thereafter, gradually reduced at a constant time rate of change (Step #04). In this state, the slip determination section 47 determines whether the specified clutch CMs starts slipping (Step #05).

In the embodiment, if the start of slip is determined (Yes at Step #05), the hydraulic pressure adjustment control is performed thereafter. In the hydraulic pressure adjustment control, the revised target pressure Pt2 is determined based on the necessary transfer torque Tn and the coefficient of dynamic friction μd of the specified clutch CMs (Step #06). Then, the supply oil pressure to the specified clutch CMs is controlled in a feedforward manner so as to coincide with the revised target pressure Pt2, and thus, is raised (increased) from the direct engagement limit pressure Pt1 to the revised target pressure Pt2 in a stepwise manner (Step #07).

In this state, the cut-off clutch CS is placed in the engaged state (Step #08), and the internal combustion engine start control is performed using the rotary electric machine torque Tm produced by the rotational speed control of the rotary electric machine 12. When the internal combustion engine 11 has begun to start and eventually becomes able to continue autonomous running (Yes at Step #09), the specified clutch CMs is returned to the original direct engagement state (Step #10). Thus, the hybrid mode shift control is finished, and the running in the hybrid running mode is started.

5. Other Embodiments

Finally, other embodiments according to the present invention will be described. Note that each structure disclosed in each of the embodiments described below can be applied in combination with structures disclosed in other embodiments as far as no contradiction occurs.

(1) In the above-described embodiment, the example has been described for the case in which, using the time of the determination of the start of slip as a reference time, the specified clutch operation control section 45a calculates the revised target pressure Pt2 based on the necessary transfer torque Tn corresponding to the requested torque Td at the time of the determination, and also based on the coefficient of dynamic friction μd. However, embodiments of the present invention are not limited to this example. That is, the specified clutch operation control section 45a is preferable as far as it is structured to calculate the revised target pressure Pt2 based on at least the coefficient of dynamic friction μd. For example, it is also one of preferable embodiments of the present invention to structure the specified clutch operation control section 45a to calculate the revised target pressure Pt2 based on the supply oil pressure (ideally coinciding with the direct engagement limit pressure Pt1) to the specified clutch CMs at the time of the determination of the start of slip, and also based on the difference between the coefficient of static friction μs and the coefficient of dynamic friction μd between the two friction engagement members of the specified clutch CMs. In this case, more specifically, the specified clutch operation control section 45a can be structured to determine the revised target pressure Pt2 by adding, to the direct engagement limit pressure Pt1, a value obtained by multiplying the difference between the coefficient of static friction μs and the coefficient of dynamic friction μd by the direct engagement limit pressure Pt1, according to Equation (5) given below.

$$Pt2 = Pt1 + (\mu s - \mu d) \cdot Pt1 \quad (5)$$

The specified clutch operation control section 45a can also be structured to determine the revised target pressure Pt2 based on a reasonable method other than those described above as far as the method can at least maintain the torque transmitted through the specified clutch CMs at the necessary transfer torque Tn corresponding to the requested torque Td.

(2) In the above-described embodiment, the example has been described for the case in which the specified clutch operation control section 45a calculates, as the hydraulic pressure adjustment control, the revised target pressure Pt2 after the slip determination section 47 determines the start of slip, and then performs the torque capacity control of the specified clutch CMs so that the supply oil pressure to the specified clutch CMs coincides with the revised target pressure Pt2. However, embodiments of the present invention are not limited to this example. That is, it is also one of preferable embodiments of the present invention to structure the specified clutch operation control section 45a to calculate, for example, as the hydraulic pressure adjustment control, the revised target pressure Pt2 in advance before the slip determination section 47 determines the start of slip, and immediately after the determination of the start of slip, performs the torque capacity control of the specified clutch CMs by using the revised target pressure Pt2.

(3) In the above-described embodiment, the example has been described for the case in which, when calculating the revised target pressure Pt2, the specified clutch operation control section 45a invariantly uses the coefficient of dynamic friction μd that is set according to the differential rotational speed of the specified clutch CMs at the time of the determination of the start of slip. However, embodiments of the present invention are not limited to this example. That is, it is also one of preferable embodiments of the present invention to structure the specified clutch operation control section 45a to calculate the revised target pressure Pt2 by using the coefficient of dynamic friction μd that changes, as a function of the differential rotational speed, according to the change in the differential rotational speed between the two friction engagement members of the specified clutch CMs.

(4) In the above-described embodiment, the example has been described for the case in which, when calculating the direct engagement limit pressure Pt1, the specified clutch operation control section 45a invariantly uses the coefficient of static friction μs set in advance. However, embodiments of the present invention are not limited to this example. That is, it is also one of preferable embodiments of the present invention to structure the specified clutch operation control section 45a to calculate the direct engagement limit pressure Pt1 by using, for example, the coefficient of static friction μs that can change between times of use thereof. As a preferable structure in such a case, a structure can be exemplified such that the drive device control unit 40 is provided with a frictional coefficient learning section 51 as shown by a dashed-line block in FIG. 1.

The frictional coefficient learning section 51 is a functional section that estimates and learns at least the coefficient of static friction μs between the two friction engagement members of the specified clutch CMs. In the present embodiment, the frictional coefficient learning section 51 estimates the coefficient of static friction μs at the time of the determination of the start of slip of the specified clutch CMs based on the requested torque Td and a hydraulic pressure command value Pr for the specified clutch CMs at the time of the determination. That is, because Equation (6) is satisfied among these values, the coefficient of static friction μs can be estimated based on Equation (6), as expressed by Equation (7).

$$Pr = k1 \cdot Td \cdot (1/\lambda) \cdot \delta/\mu s + B \quad (6)$$

$$\mu s = k1 \cdot Td \cdot (1/\lambda) \cdot \delta/(Pr - B) \quad (7)$$

Here, λ, k1, δ, and B are the same as those described in the above-described embodiment.

For example, the frictional coefficient learning section 51 stores the thus estimated coefficient of static friction μs in the recording device such as a memory each time when the hybrid mode shift control including the hydraulic pressure adjustment control is performed. Then, the frictional coefficient learning section 51 derives a learned coefficient of static friction μss based on the stored information on the coefficient of static friction μs. As the learned coefficient of static friction μss such as described above, it is possible to exemplify the latest coefficient of static friction μs at the time, or a value (such as a mean value, a weight mean value, or a mode) obtained by applying predetermined statistical processing to a plurality of values of the coefficient of static friction μs stored in a predetermined period of time including the time of the derivation. By being structured to be provided with the frictional coefficient learning section 51 such as described above, the specified clutch operation control section 45a can always calculate an appropriate value of the direct engagement limit pressure Pt1 by using the learned coefficient of static friction μss reflecting the latest state of the specified clutch CMs even if the coefficient of static friction μs changes, for example, as the specified clutch CMs deteriorates with age. Considering that any one of the multiple shifting clutches CM can serve as the specified clutch CMs depending on the shift speed established while the vehicle 6 travels in the electric running mode, the frictional coefficient learning section 51 is preferable to be structured to learn individually the coefficient of static friction μs of each of the multiple shifting clutches CM.

Moreover, the frictional coefficient learning section 51 may be structured to have a function of learning the coefficient of dynamic friction μd between the two friction engagement members of the specified clutch CMs. For example, the control device 4 can be structured to be capable of detecting a phenomenon caused by deviation between the requested torque Td and the torque actually transmitted to the output shaft O at the time of the determination of the start of slip, and the frictional coefficient learning section 51 can be structured to correct, when such a phenomenon is detected, the coefficient of dynamic friction μd so as to cancel out the deviation and store the corrected coefficient of dynamic friction μd in the recording device such as a memory. By providing such a function in the frictional coefficient learning section 51, the specified clutch operation control section 45a can always calculate an appropriate value of the revised target pressure Pt2 even if the coefficient of dynamic friction μd changes, for example, as the specified clutch CMs deteriorates with age.

(5) In the above-described embodiment, the example has been described for the case in which the slip determination section 47 determines the start of slip of the specified clutch CMs based on the differential rotational speed between the actual rotational speed and the estimated rotational speed of the intermediate shaft M, and also based on the slip determination threshold Th1 set in advance. However, embodiments of the present invention are not limited to this example. That is, it is also one of preferable embodiments of the present invention to structure the slip determination section 47 to determine the start of slip of the specified clutch CMs based on, for example, the differential rotational speed between the actual rotational speed of the output shaft O and an estimated rotational speed of the output shaft O calculated from the rotational speed of the intermediate shaft M, and also based on a slip determination threshold Th1' set in advance. Further, it is also one of preferable embodiments of the present invention to structure the slip determination section 47 to determine the start of slip of the specified clutch CMs based on a differential rotational speed between an estimated rotational speed of the friction engagement member on one side of the specified clutch CMs calculated from the rotational speed of the intermediate shaft M and an estimated rotational speed of the friction engagement member on the other side of the specified clutch CMs calculated from the rotational speed of the output shaft O, and also based on a slip determination threshold Th1" set in advance. The same preferable embodiments apply to the determination of the end of slip of the specified clutch CMs.

Alternatively, it is also one of preferable embodiments of the present invention to structure the slip determination section 47 to monitor time passed from a predetermined reference time by using a timer or the like, and determine the start of slip of the specified clutch CMs based on a slip determination time set in advance. The "reference time" in this case can be set, for example, at the point of time when the differential rotational speed starts to occur between the actual rotational speed and the estimated rotational speed of the intermediate shaft M, or at the point of time when the supply oil pressure to the specified clutch CMs starts to be reduced.

Figure 5:
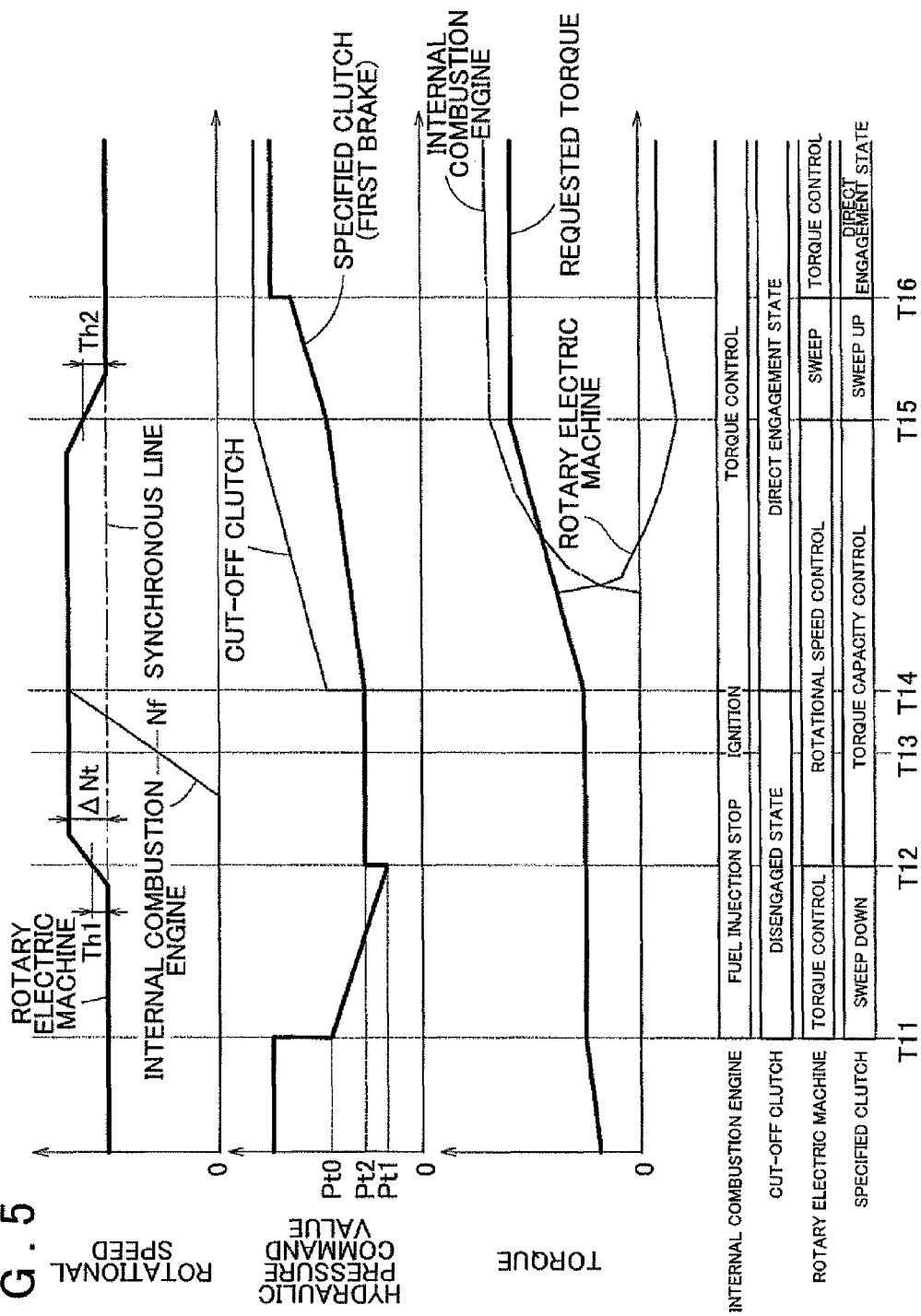
FIG. 5 is a timing chart showing another example of operating states of the respective parts when the hybrid mode shift control is performed.

(6) In the above-described embodiment, the example has been described for the case in which the driving state control section 46 performs the internal combustion engine start control (hybrid mode shift control) by using the torque of the rotary electric machine 12 provided in the power transmission path connecting the input shaft I with the output shaft O. However, embodiments of the present invention are not limited to this example. That is, for example, if the drive device 1 to be controlled by the control device 4 is provided, separately from the rotary electric machine 12, with a starting-purpose rotary electric machine (such as a starter motor, not shown) for starting the internal combustion engine 11, it is also one of preferable embodiments of the present invention to structure the driving state control section 46 to perform the internal combustion engine start control (hybrid mode shift control) by using torque of the starting-purpose rotary electric machine. In this case, as shown in FIG. 5, the driving state control section 46 outputs an internal combustion engine start command for starting the internal combustion engine 11 to the starting-purpose rotary electric machine and shifts the specified clutch CMs from the direct engagement state to the slip engagement state, and, after the slip determination section 47 determines the start of slip, the driving state control section 46 shifts the cut-off clutch CS from the disengaged state to the engaged state, and thereafter, shifts the specified clutch CMs from the slip engagement state to the direct engagement state. The contents of the hydraulic pressure adjustment control and the hybrid mode shift control performed in that case are basically the same as those described in the above-described embodiment, and therefore, detailed description is omitted here.

(7) In the above-described embodiment, the example has been described for the case in which the rotary electric machine control section 43 performs the rotational speed control of the rotary electric machine 12 after the determination of the start of slip of the specified clutch CMs. However, embodiments of the present invention are not limited to this example. That is, the rotary electric machine control section 43 is preferable as far as it is structured to control the rotary electric machine 12 so that the rotational state of the rotary electric machine 12 coincides with the target rotational state thereof in the slip engagement state of the specified clutch CMs. Otherwise, the rotary electric machine control section 43 can be structured, for example, to perform rotational position control so that the rotational position of the rotary electric machine 12 coincides with the target rotational position, or to perform rotational acceleration control so that the rotational acceleration of the rotary electric machine 12 coincides with the target rotational acceleration. The rotary electric machine control section 43 can also be structured to perform two or more of the rotational position control, the rotational speed control, and the rotational acceleration control of the rotary electric machine 12 in a concurrent manner.

(8) In the above-described embodiment, the example has been described for the case in which the case is assumed that the first clutch C1 and the first brake B1 are placed in the direct engagement state for establishing the predetermined shift speed, and of them, the first brake B1 is treated as the specified clutch CMs serving as the "second friction engagement device". However, embodiments of the present invention are not limited to this example. That is, it is also one of preferable embodiments of the present invention to treat, for example, the first clutch C1 as the specified clutch CMs in the above-described assumed example. Note that, when the shift speed established in the speed change mechanism 13 is changed, the specified clutch CMs is also changed following that change, as a matter of course. In other words, any one of the multiple shifting clutches CM in the speed change mechanism 13 can serve as the "second friction engagement device" in the present invention. Three or more of the shifting clutches CM may be structured to be placed in the engaged state when each of the shift speeds is established. In this case, it is sufficient to treat any one of the three or more shifting clutches CM as the specified clutch CMs serving as the "second friction engagement device".

(9) In the above-described embodiment, the example has been described for the case in which one of the shifting clutches CM in the speed change mechanism 13 serves as the "second friction engagement device" in the drive device 1 to be controlled by the control device 4. However, embodiments of the present invention are not limited to this example. That is, any clutch other than the shifting clutches CM in the speed change mechanism 13 can serve as the "second friction engagement device" as far as the clutch is a friction engagement device provided between the rotary electric machine 12 and the output shaft O in the power transmission path connecting the input shaft I with the output shaft O. For example, if a fluid coupling such as a torque converter is provided between the rotary electric machine 12 and the speed change mechanism 13, it is also one of preferable embodiments of the present invention to make a lock-up clutch included in the fluid coupling serve as the "second friction engagement device". Alternatively, it is also one of preferable embodiments of the present invention to, for example, provide a special-purpose transfer clutch between the rotary electric machine 12 and the speed change mechanism 13, or between the speed change mechanism 13 and the output shaft O, and make the transfer clutch serve as the "second friction engagement device". In these cases, as the speed change mechanism 13, an automatic stepless speed change mechanism, a manual stepped speed change mechanism, or a fixed-ratio speed change mechanism can be used instead of the automatic stepped speed change mechanism. The location of the speed change mechanism 13 can also be set at an arbitrary place.

(10) In the above-described embodiment, the example has been described for the case in which the cut-off clutch CS serving as the "first friction engagement device" provided in the drive device 1 to be controlled by the control device 4 and the shifting clutches CM including the specified clutch CMs serving as the "second friction engagement device" in the speed change mechanism 13 are the hydraulically driven friction engagement devices in each of which the engagement pressure is controlled according to the hydraulic pressure supplied thereto. However, embodiments of the present invention are not limited to this example. That is, the first friction engagement device and the second friction engagement device are sufficient as far as they are each adjustable in the transfer torque capacity thereof according to increase and decrease of the engagement pressure, and it is also one of preferable embodiments of the present invention to structure one or both of the first and the second friction engagement devices as electromagnetic friction engagement devices in each of which the engagement pressure is controlled according to a generated electromagnetic force.

(11) In the above-described embodiment, the example has been described for the case in which the internal combustion engine control unit 30 for mainly controlling the internal combustion engine 11 and the drive device control unit 40 (control device 4) for mainly controlling the rotary electric machine 12, the cut-off clutch CS, and the speed change mechanism 13 are individually provided. However, embodiments of the present invention are not limited to this example. That is, it is also one of preferable embodiments of the present invention to structure, for example, the single control device 4 to control all of the internal combustion engine 11, the rotary electric machine 12, the cut-off clutch CS, the speed change mechanism 13, and like. Alternatively, it is also one of preferable embodiments of the present invention to structure the control device 4 to be further provided with a control unit for controlling the rotary electric machine 12 and a control unit for controlling various other structures in an individual manner. The assignment of the functional sections described in each of the above-described embodiments is merely an example, and it is possible to combine more than one of the functional sections or to further divide the single functional sections.

(12) Also regarding other structures, the embodiments disclosed herein are examples in all respects, and embodiments of the present invention are not limited to those examples. That is, the structures that are not described in the claims of the present patent application can be modified as appropriate within the scope of not departing from the object of the present invention.

The present invention can be preferably used for a control device for controlling a vehicle drive device provided with a rotary electric machine in a power transmission path connecting an internal combustion engine with wheels, a first friction engagement device between the internal combustion engine and the rotary electric machine, and a second friction engagement device between the rotary electric machine and the wheels.

What is claimed is:

1. A control device for controlling a vehicle drive device, the control device comprising:
a rotary electric machine in a power transmission path connecting an internal combustion engine with wheels;
a first friction engagement device between the internal combustion engine and the rotary electric machine; and
a second friction engagement device between the rotary electric machine and the wheels, wherein
the control device shifts the state of the first friction engagement device and the second friction engagement device from a state in which the first friction engagement device is in a disengaged state and the second friction engagement device is in a direct engagement state so that a driving force is transmitted between the rotary electric machine and the wheels, to a state in which the driving force is transmitted at least between the internal combustion engine and the wheels, by shifting the second friction engagement device from the direct engagement state to a slip engagement state and thereafter shifting the first friction engagement device from the disengaged state to an engaged state; after the state is changed, the control device shifts the second friction engagement device from the slip engagement state to the direct engagement state;
in this operation, the control device performs control to gradually reduce a supply oil pressure to the second friction engagement device so as to shift the second friction engagement device from the direct engagement state to the slip engagement state, and when the second friction engagement device is determined to have started slipping, to increase the supply oil pressure to the second friction engagement device by a predetermined amount of hydraulic pressure relative to the supply oil pressure at the time of the determination of the start of slip.

2. The control device according to claim 1, wherein the control device increases the supply oil pressure to the second friction engagement device at least based on a phenomenon that a coefficient of friction between a friction engagement member on the side of the rotary electric machine and a friction engagement member on the side of the wheels in the second friction engagement device changes from a coefficient of static friction to a coefficient of dynamic friction at the time of the determination of the start of slip.

3. The control device according to claim 2, wherein the control device controls the supply oil pressure to the second friction engagement device based on the coefficient of static friction and requested torque required to be transmitted to the wheels after the start of reducing the supply oil pressure to the second friction engagement device but before the determination of the start of slip, and increases the supply oil pressure to the second friction engagement device based on the coefficient of dynamic friction and the requested torque after the determination of the start of slip.

4. The control device according to claim 2, wherein the control device calculates the predetermined amount of hydraulic pressure based on the supply oil pressure to the second friction engagement device at the time of the determination of the start of slip and a difference between the coefficient of static friction and the coefficient of dynamic friction.

5. The control device according to claim 1, wherein the control device maintains the supply oil pressure to the second friction engagement device at the level increased by the predetermined amount of hydraulic pressure until the second friction engagement device is shifted from the slip engagement state to the direct engagement state.

6. The control device according to claim 1, wherein the control device calculates, based on requested torque required to be transmitted to the wheels, the supply oil pressure to the second friction engagement device gradually reduced before the determination of the start of slip and the supply oil pressure to the second friction engagement device maintained after the determination of the start of slip.

7. The control device according to claim 1, wherein the control device performs control so that output torque of the rotary electric machine coincides with target torque when the second friction engagement device is in the direct engagement state, and performs control so that the rotational state of the rotary electric machine coincides with a target rotational state after the determination of the start of slip.

8. The control device according to claim 7, wherein the rotational state is a rotational speed while the target rotational state is a target rotational speed, and the control device sets the target rotational speed to such a value that a differential rotational speed between an input-side rotational member and an output-side rotational member of the second friction engagement device is greater than the differential rotational speed therebetween at the time of the determination of the start of slip.

9. The control device according to claim 1, wherein in order to change the state from the state in which the driving force is transmitted between the rotary electric machine and the wheels to the state in which the driving force is transmitted at least between the internal combustion engine and the wheels, the second friction engagement device is shifted from the direct engagement state to the slip engagement state, and after the determination of the start of slip, the first friction engagement device is shifted from the disengaged state to the engaged state, and after the internal combustion engine is ignited while being rotated by the torque of the rotary electric machine, the second friction engagement device is shifted from the slip engagement state to the direct engagement state.

10. The control device according to claim 1, wherein the control device is for controlling a vehicle drive device provided, separately from the rotary electric machine, with a starting-purpose rotary electric machine for starting the internal combustion engine, and to change the state from the state in which the driving force is transmitted between the rotary electric machine and the wheels to the state in which the driving force is transmitted at least between the internal combustion engine and the wheels, the control device shifts the second friction engagement device from the direct engagement state to the slip engagement state and, after the determination of the start of slip and also after the start of the internal combustion engine by the starting-purpose rotary electric machine, shifts the first friction engagement device from the disengaged state to the engaged state and, thereafter, shifts the second friction engagement device from the slip engagement state to the directly connected engagement.

\* \* \* \* \*